US008482147B2

(12) United States Patent
Moser et al.

(10) Patent No.: US 8,482,147 B2
(45) Date of Patent: Jul. 9, 2013

(54) WIND TURBINE WITH POWERED SYNCHRONIZATION SYSTEM

(76) Inventors: George Moser, Brighton, MI (US);
Randy W. Linn, Charlotte, MI (US);
Van Walworth, Lebanon, TN (US);
Jerome B. York, Oakland, MI (US);
Lisa Shzlow, legal representative,
Charlotte, NC (US)

( * ) Notice: Subject to any disclaimer, the term of this patent is extended or adjusted under 35 U.S.C. 154(b) by 337 days.

(21) Appl. No.: 12/840,882

(22) Filed: Jul. 21, 2010

(65) Prior Publication Data
US 2011/0018269 A1     Jan. 27, 2011

Related U.S. Application Data

(60) Provisional application No. 61/271,406, filed on Jul. 21, 2009.

(51) Int. Cl.
F03D 11/00 (2006.01)
(52) U.S. Cl.
USPC .......................................................... 290/55
(58) Field of Classification Search
USPC .......................................................... 290/44
See application file for complete search history.

(56) References Cited

U.S. PATENT DOCUMENTS

| 543,462 | A | 7/1895 | Bramwell |
| 554,138 | A | 2/1896 | Negbaur et al. |
| 556,803 | A | 3/1896 | Bramwell |
| 1,455,862 | A | 5/1923 | Brzykcy |
| 1,503,526 | A | 8/1924 | Dulak |
| 1,633,460 | A * | 6/1927 | Silvestrin .................... 416/150 |
| 2,224,052 | A | 12/1940 | Irwin |
| 2,379,833 | A * | 7/1945 | Sharp ........................ 416/171 |
| 2,517,135 | A | 8/1950 | Rudisill |
| 2,539,862 | A | 1/1951 | Rushing |
| 2,598,662 | A | 6/1952 | Gurley et al. |
| 3,942,026 | A * | 3/1976 | Carter ........................... 290/55 |
| 3,944,839 | A | 3/1976 | Carter |
| 4,021,135 | A | 5/1977 | Pedersen et al. |
| 4,134,707 | A | 1/1979 | Ewers |
| 4,143,992 | A | 3/1979 | Crook |
| 4,186,312 | A * | 1/1980 | Dvorak ........................ 290/4 R |
| 4,218,175 | A | 8/1980 | Carpenter |
| 4,229,661 | A * | 10/1980 | Mead et al. ..................... 290/44 |
| 4,242,050 | A * | 12/1980 | Oakes ....................... 416/170 R |
| 4,291,233 | A | 9/1981 | Kirschbaum |
| 4,311,434 | A | 1/1982 | Abe |

(Continued)

FOREIGN PATENT DOCUMENTS

| EP | 737811 A1 | * | 10/1996 |
| JP | 2003278639 A | * | 10/2003 |
| KR | 832053 B1 | * | 5/2008 |
| SU | 1076617 A | * | 2/1984 |

*Primary Examiner* — Joseph Waks
(74) *Attorney, Agent, or Firm* — McDermott Will & Emery LLP

(57) ABSTRACT

A wind turbine system is provided to generate electricity from wind energy. The system locates generator at a bottom portion of the tower. The system rotates either the entire tower, or the nacelle and the generator simultaneously. A flexible power transfer member inside the tower connects a top rotation transfer member and the bottom rotation transfer member to transfer wind energy captured by the turbine rotor from the top rotation transfer member to the bottom rotation transfer member. A pitch mechanism to rotate the rotor blades in a desired angular position about the rotor blades longitudinal axis is also provided.

11 Claims, 35 Drawing Sheets

U.S. PATENT DOCUMENTS

| | | | |
|---|---|---|---|
| 4,311,435 A | 1/1982 | Bergero | |
| 4,372,732 A | 2/1983 | Browning | |
| 4,446,376 A * | 5/1984 | Baker | 290/44 |
| 4,464,579 A * | 8/1984 | Schwarz | 290/44 |
| 4,496,846 A | 1/1985 | Parkins | |
| 4,496,847 A | 1/1985 | Parkins | |
| 4,498,017 A | 2/1985 | Parkins | |
| 4,565,929 A | 1/1986 | Baskin et al. | |
| 5,133,637 A | 7/1992 | Wadsworth | |
| 5,436,508 A | 7/1995 | Sorensen | |
| 6,749,399 B2 * | 6/2004 | Heronemus | 416/41 |
| 6,856,042 B1 * | 2/2005 | Kubota | 290/55 |
| 7,183,664 B2 | 2/2007 | McClintic | |
| 7,329,099 B2 | 2/2008 | Hartman | |
| 7,365,446 B2 | 4/2008 | Wobben | |
| 7,436,086 B2 | 10/2008 | McClintic | |
| 7,482,707 B2 | 1/2009 | Wobben | |
| 7,504,742 B2 | 3/2009 | Wobben | |
| 7,656,055 B2 | 2/2010 | Torres et al. | |
| 7,663,263 B2 | 2/2010 | Wobben | |
| 8,030,790 B2 * | 10/2011 | Kamenov | 290/43 |
| 8,072,089 B2 * | 12/2011 | Krouse et al. | 290/54 |
| 8,258,646 B2 * | 9/2012 | Oosterling | 290/55 |
| 2003/0015877 A1 | 1/2003 | Schlemenat | |
| 2004/0047723 A1 * | 3/2004 | Horjus | 415/4.2 |
| 2008/0050237 A1 * | 2/2008 | Lee | 416/197 A |
| 2009/0058095 A1 | 3/2009 | McClintic | |
| 2010/0019503 A1 | 1/2010 | Wobben | |

\* cited by examiner

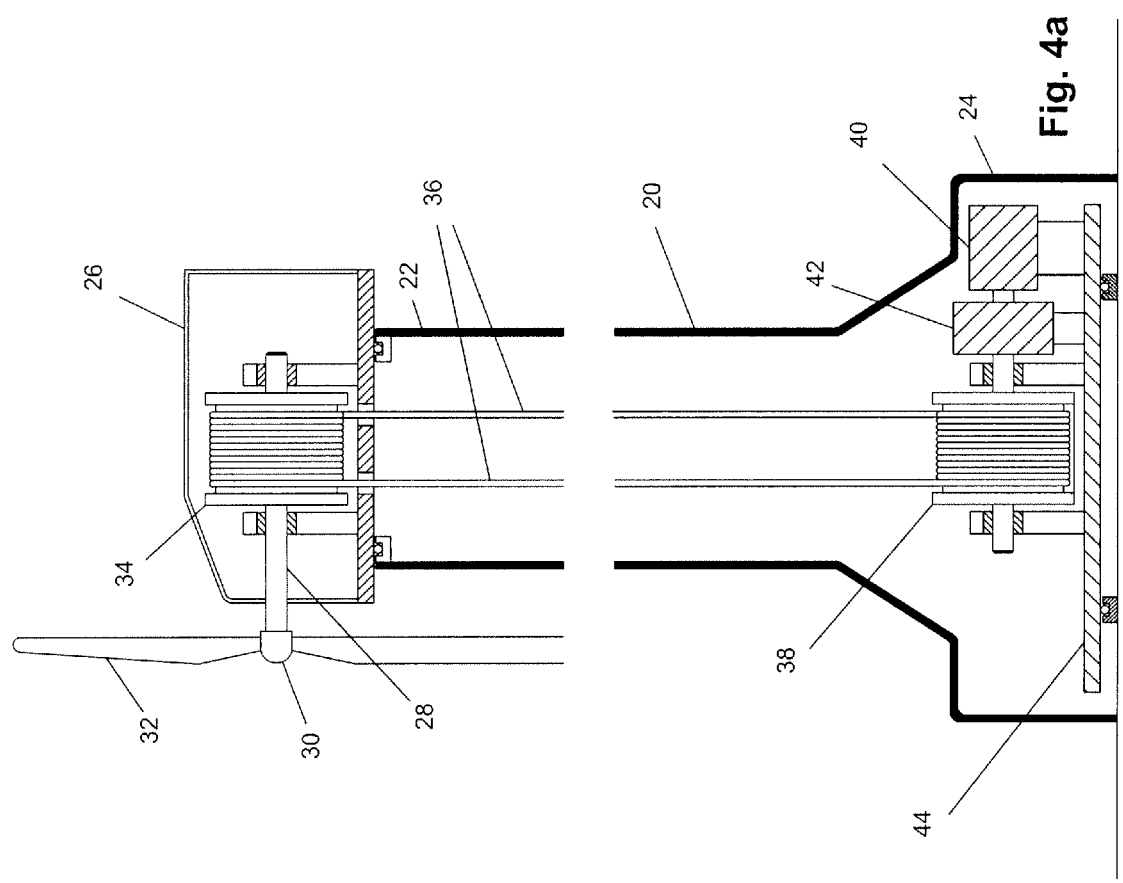

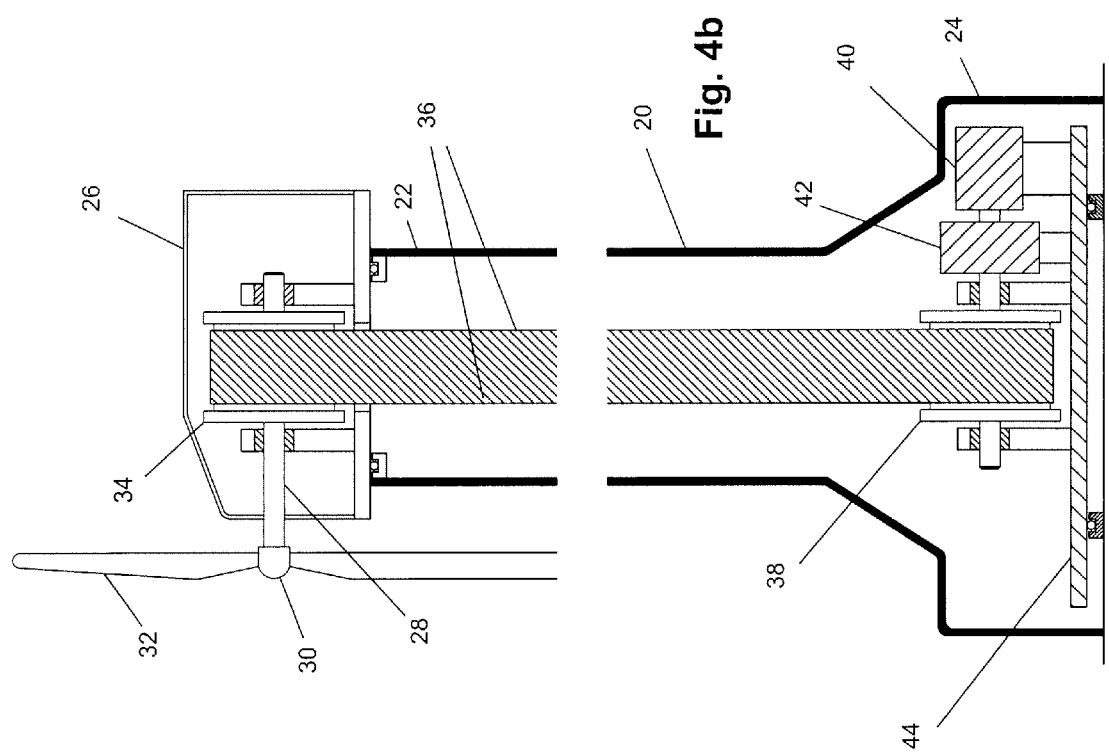

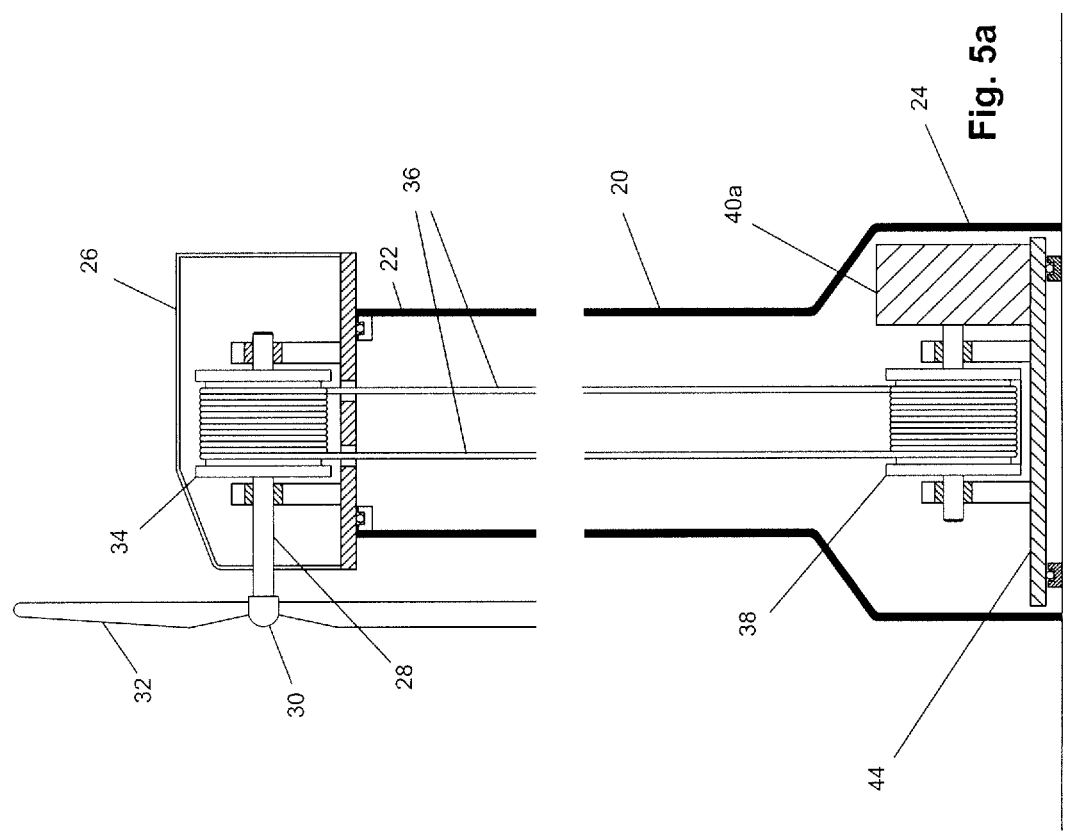

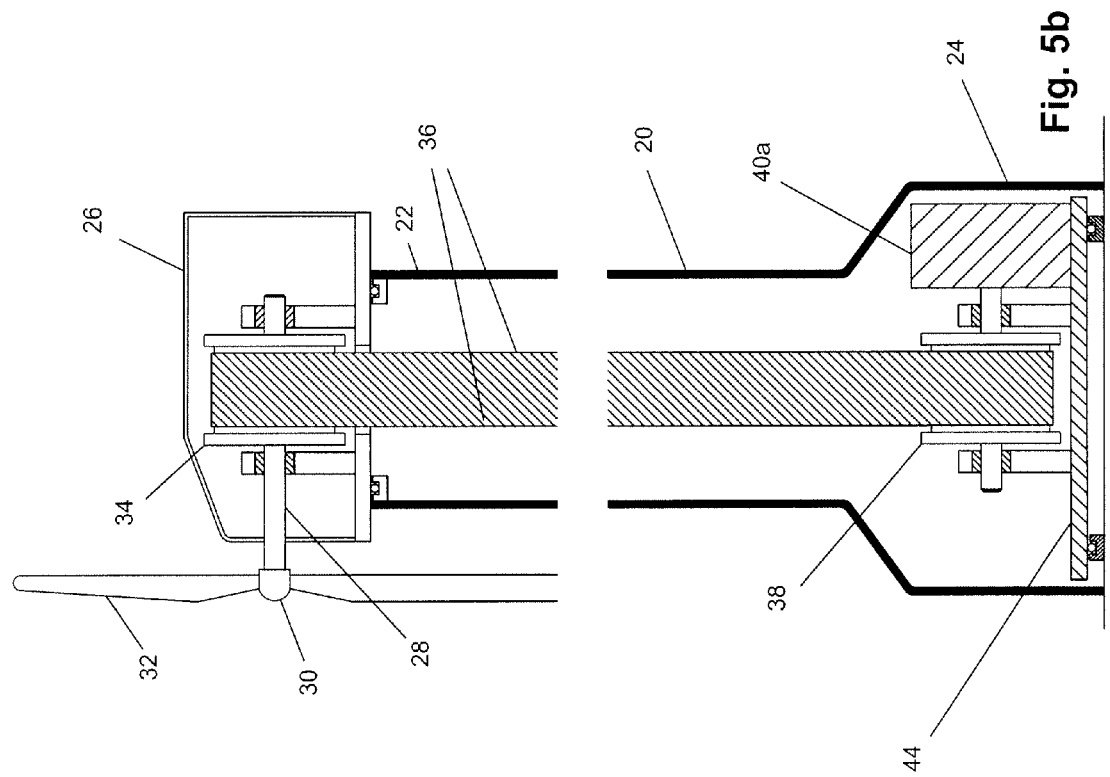

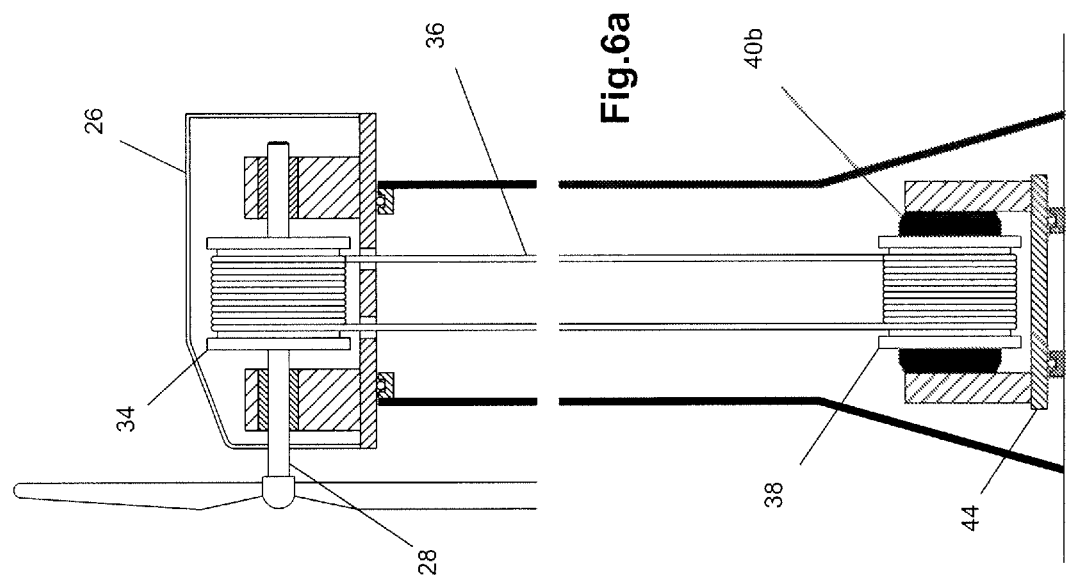

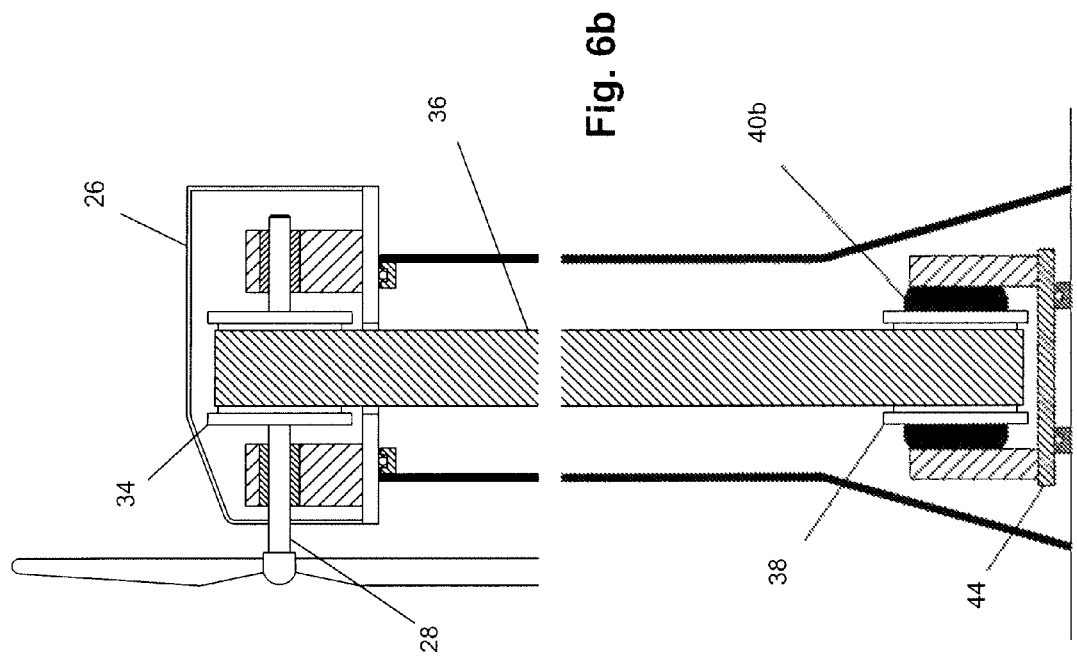

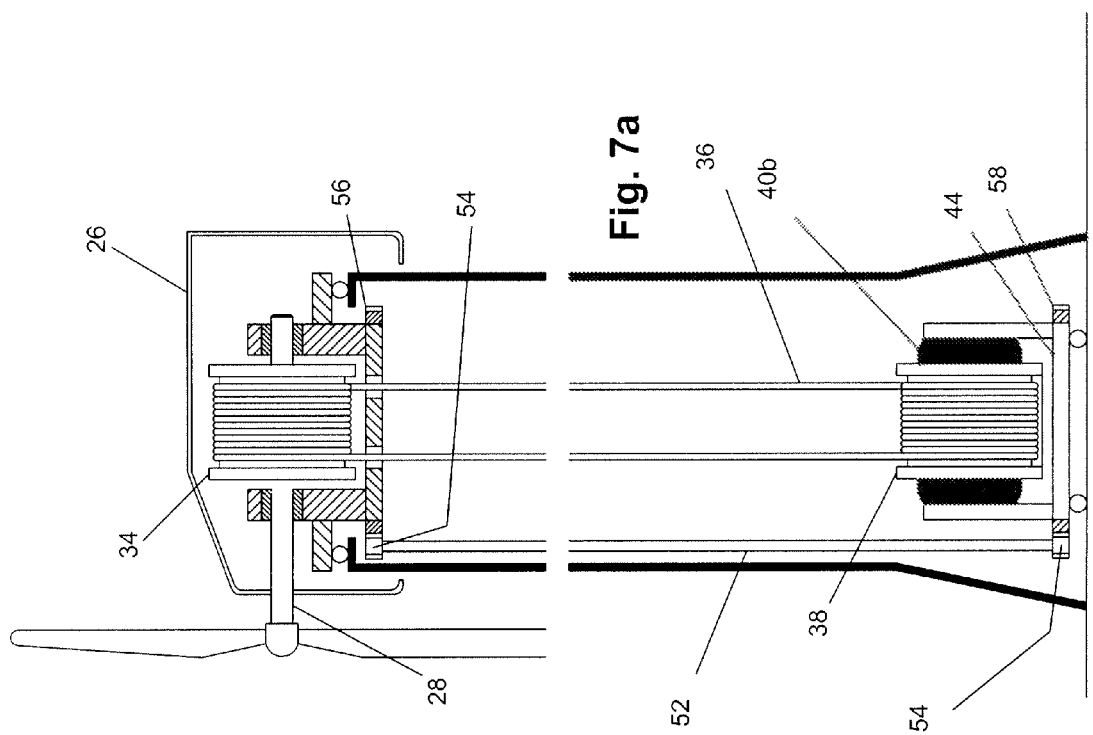

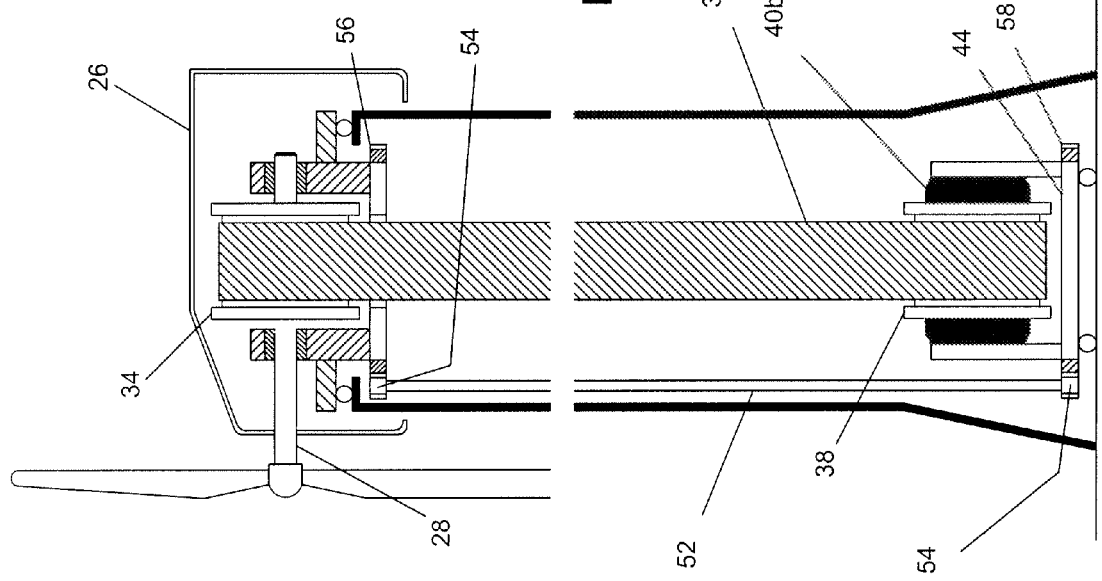

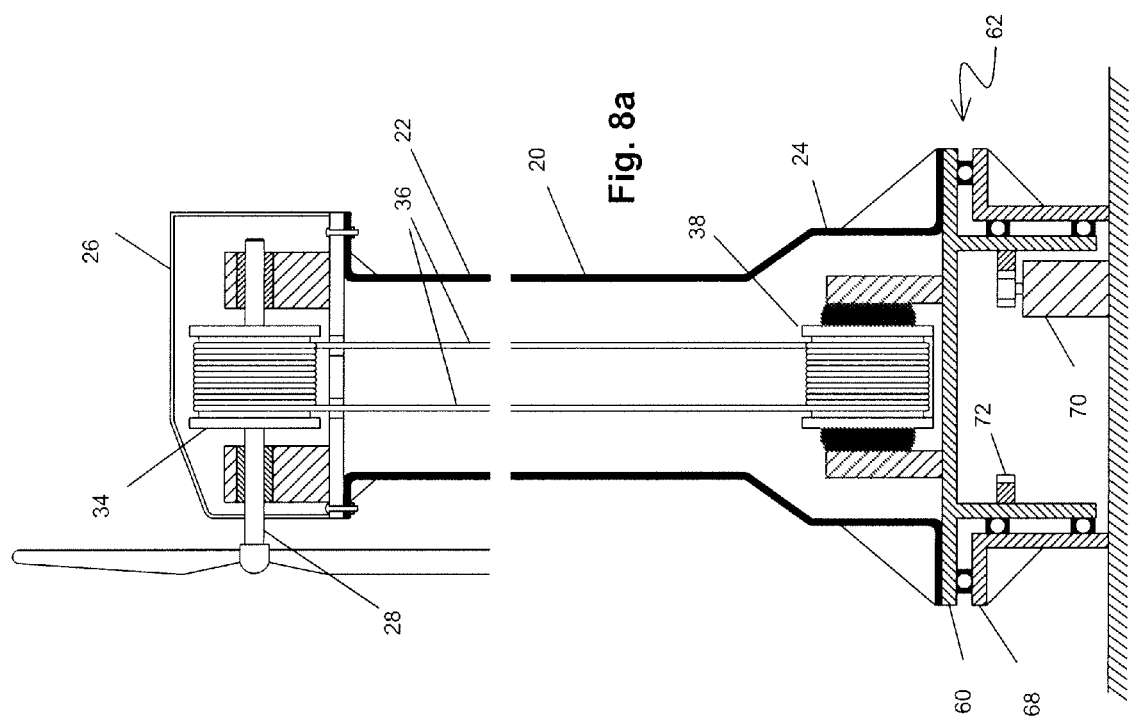

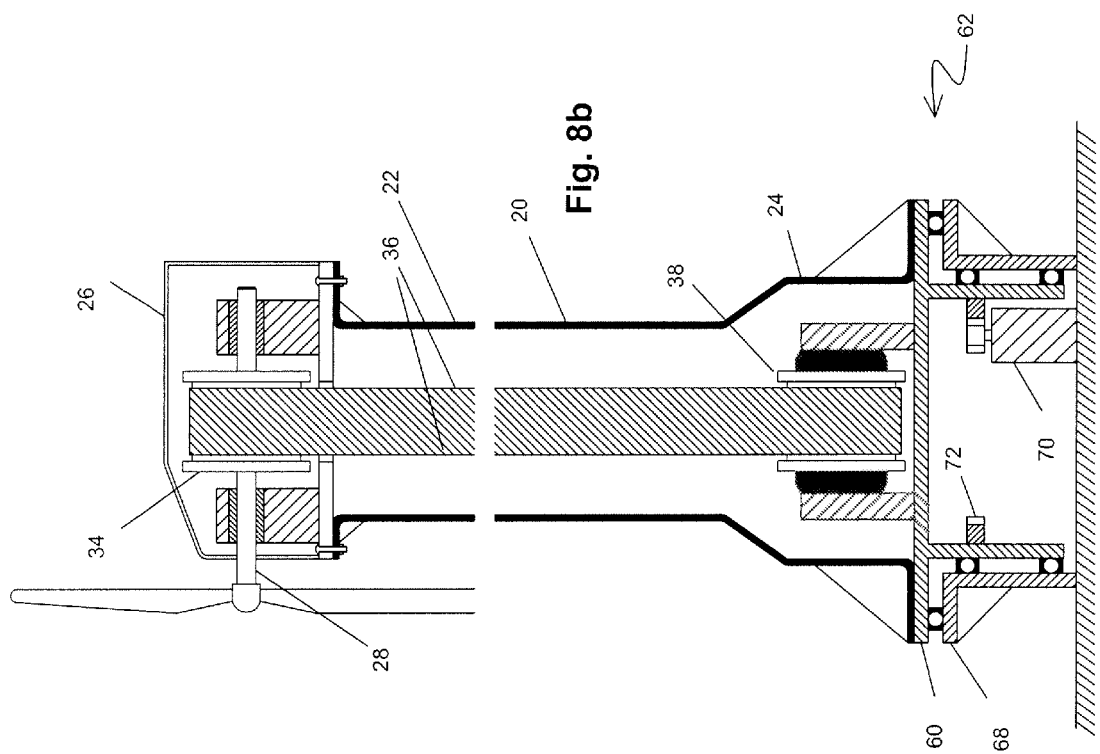

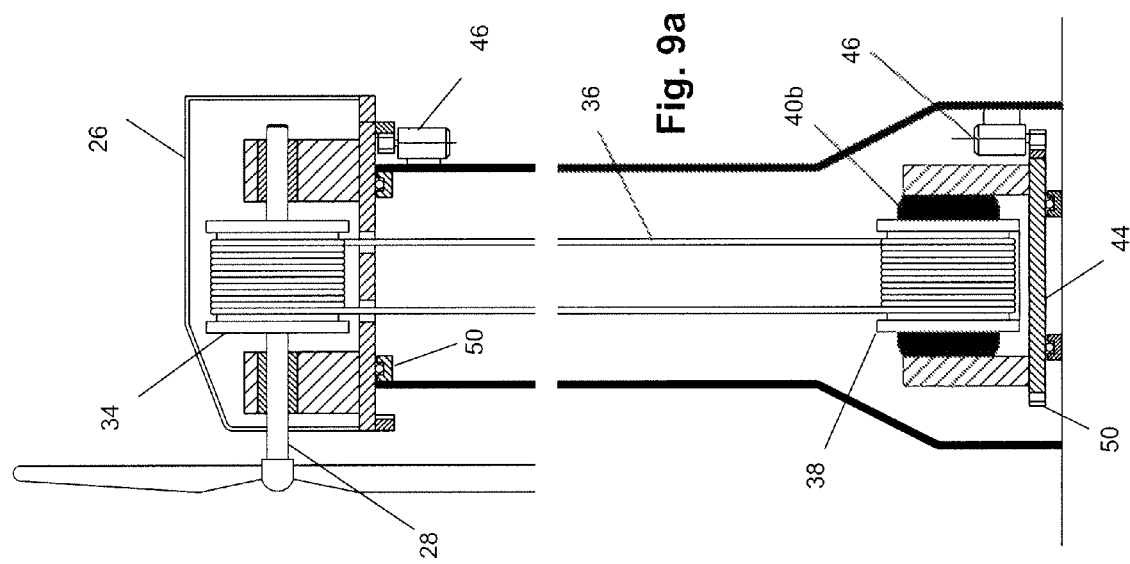

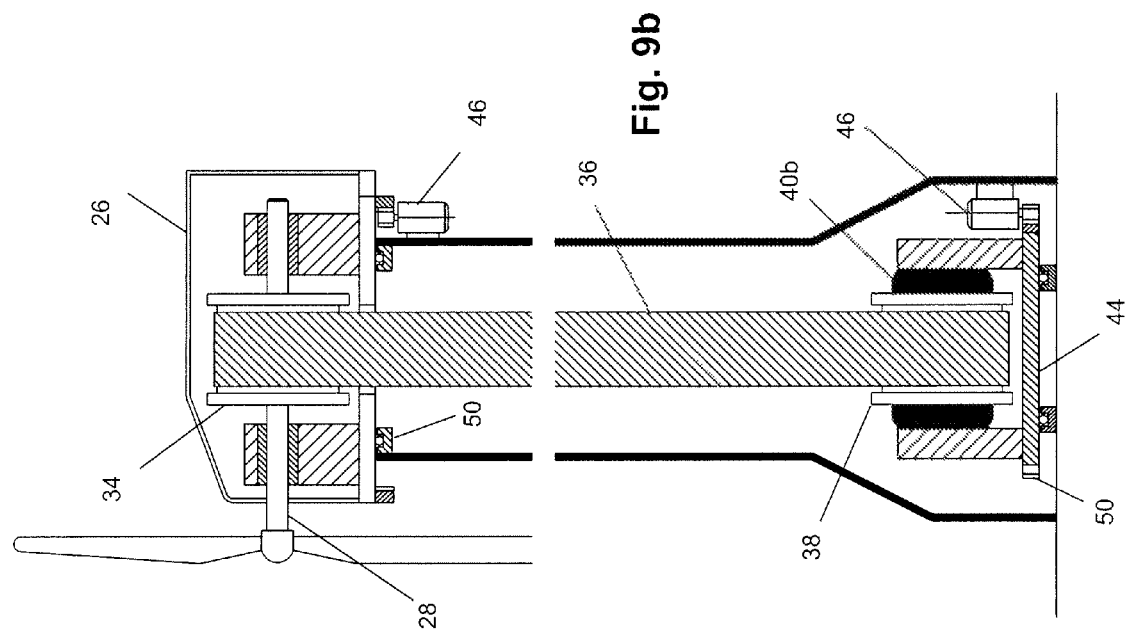

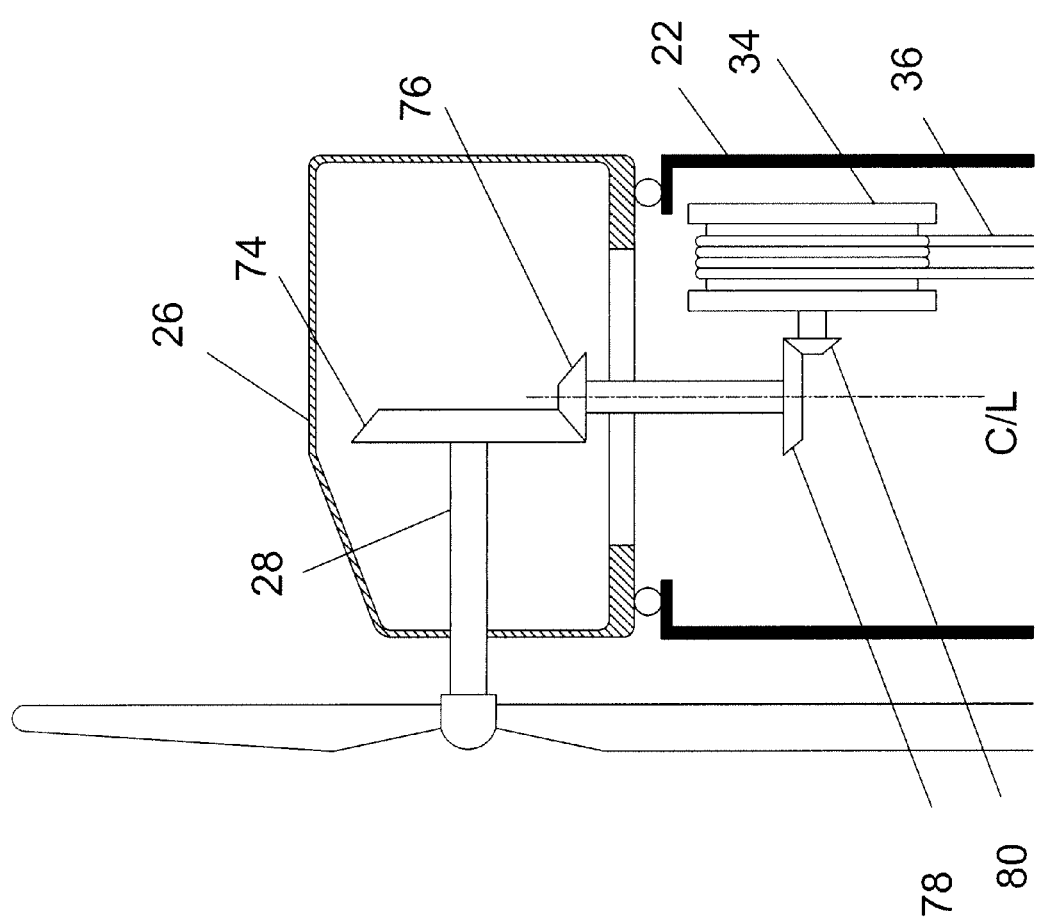

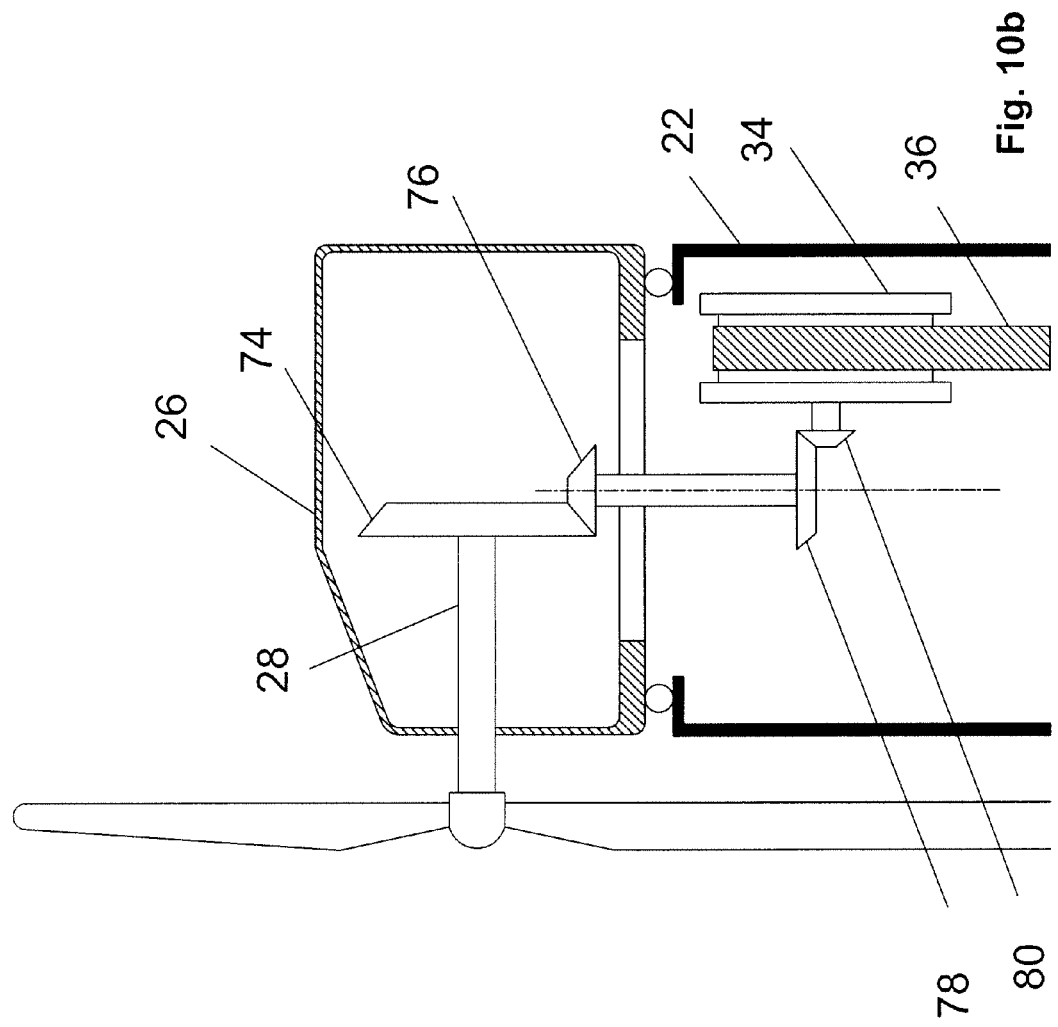

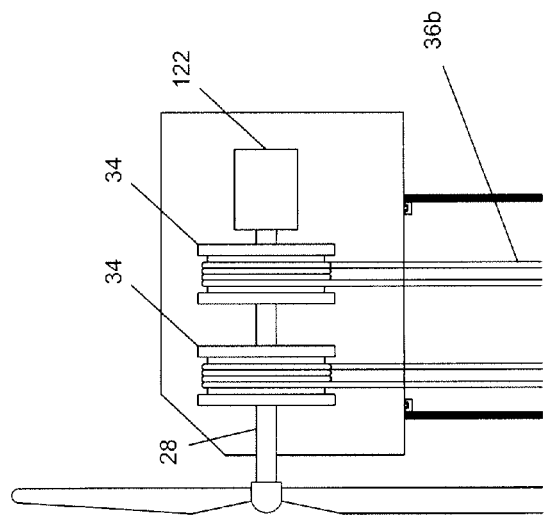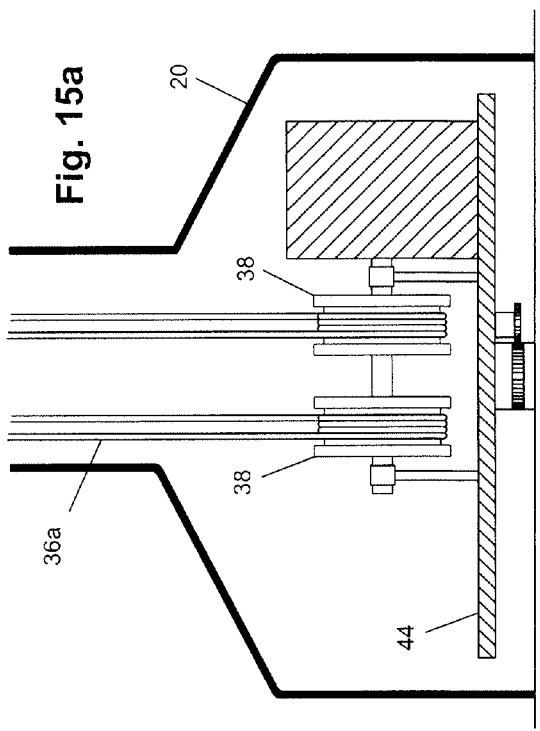
Fig. 15a

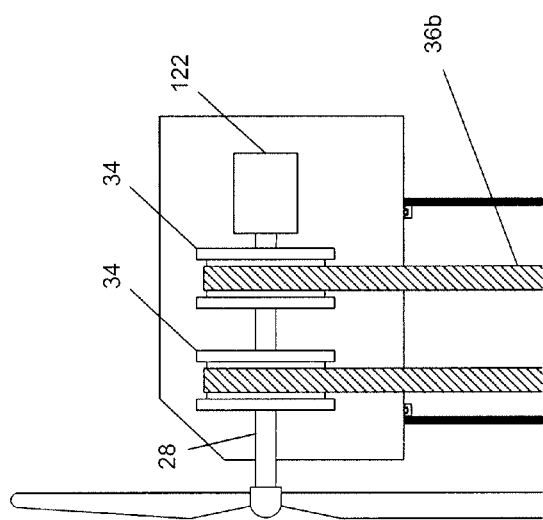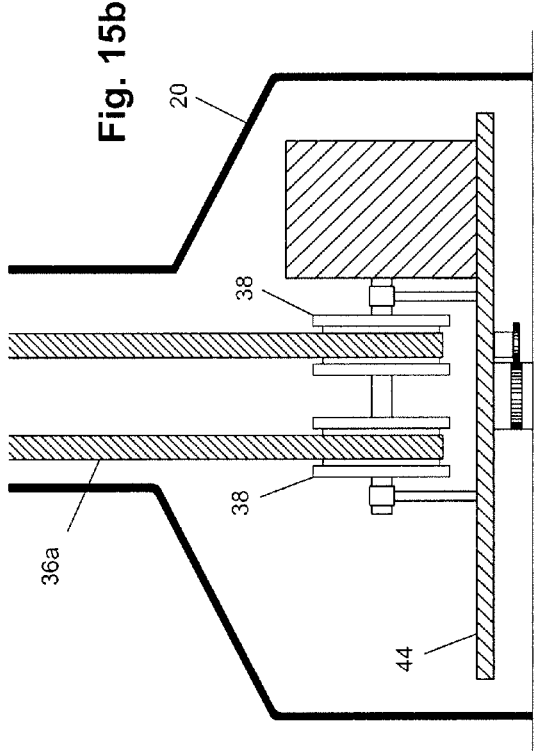
Fig. 15b

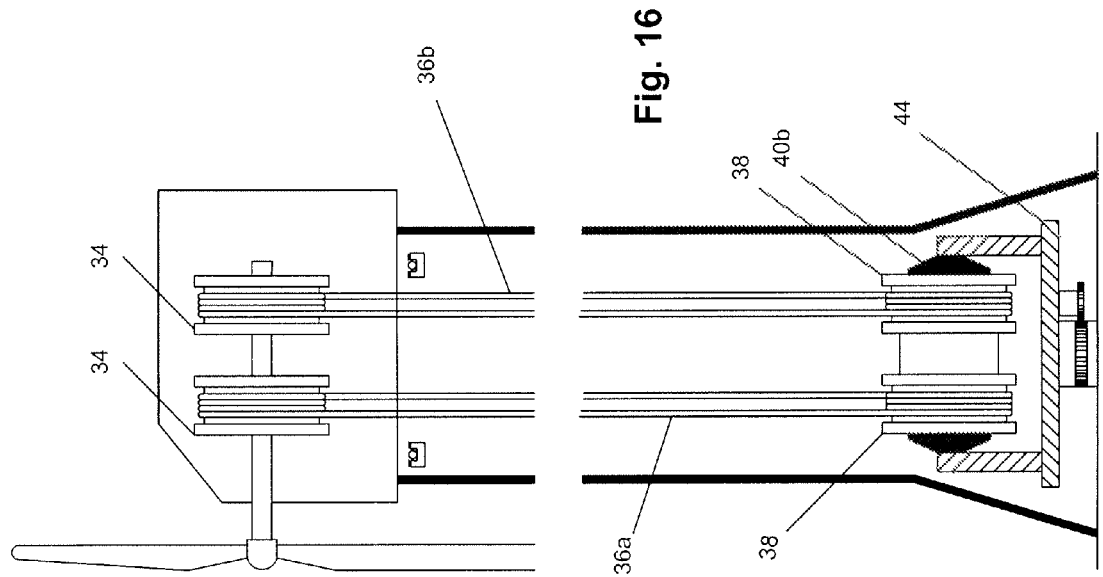

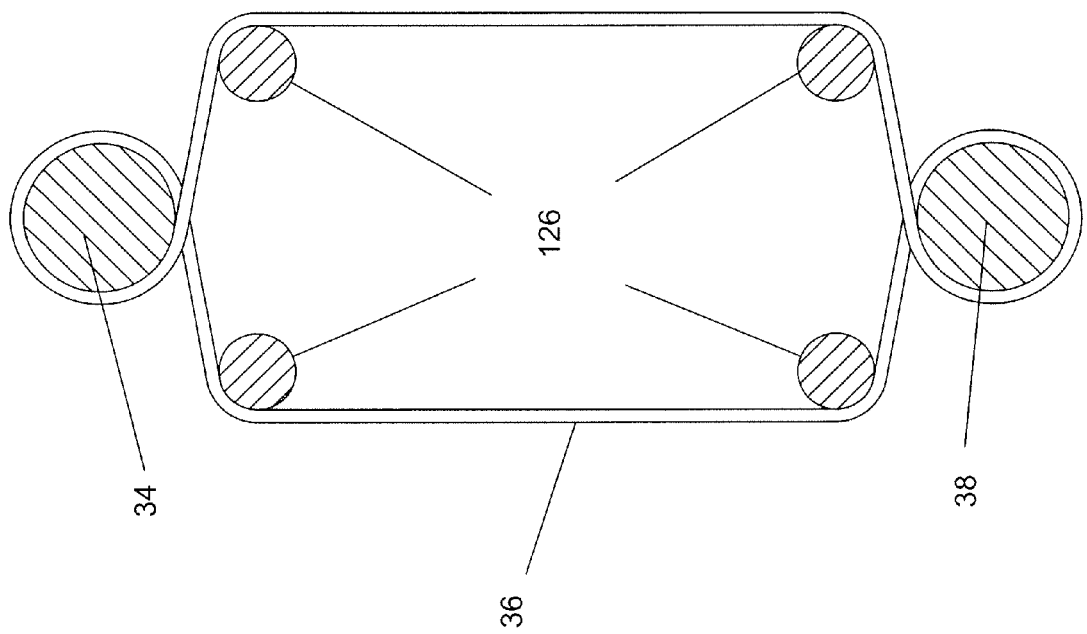

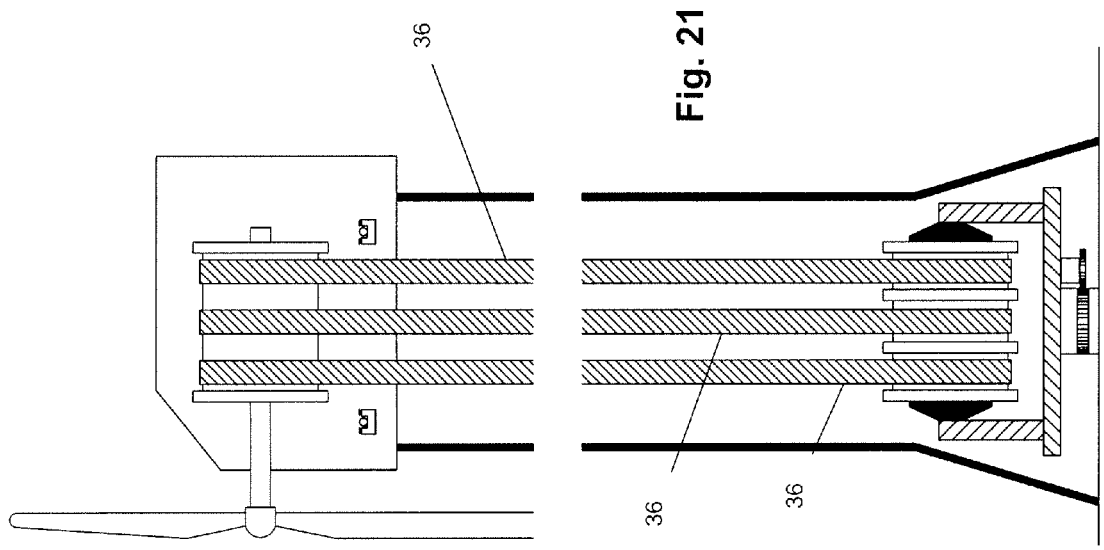

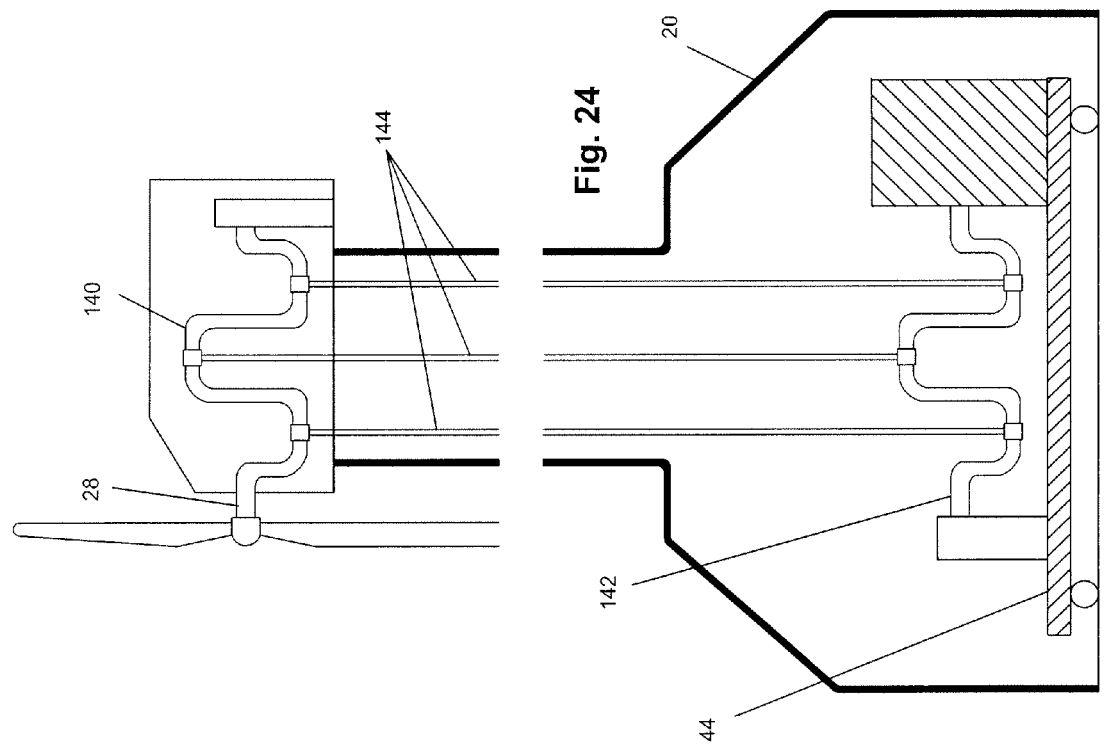

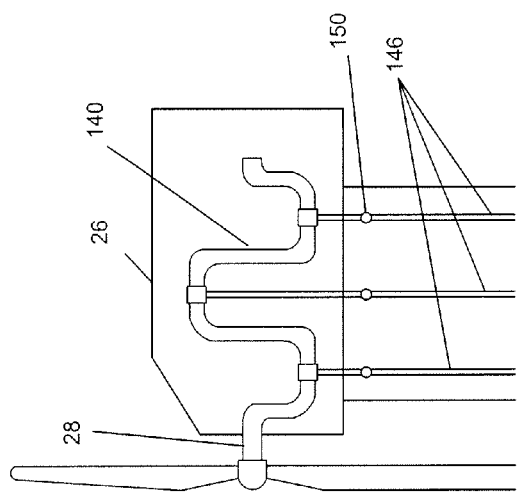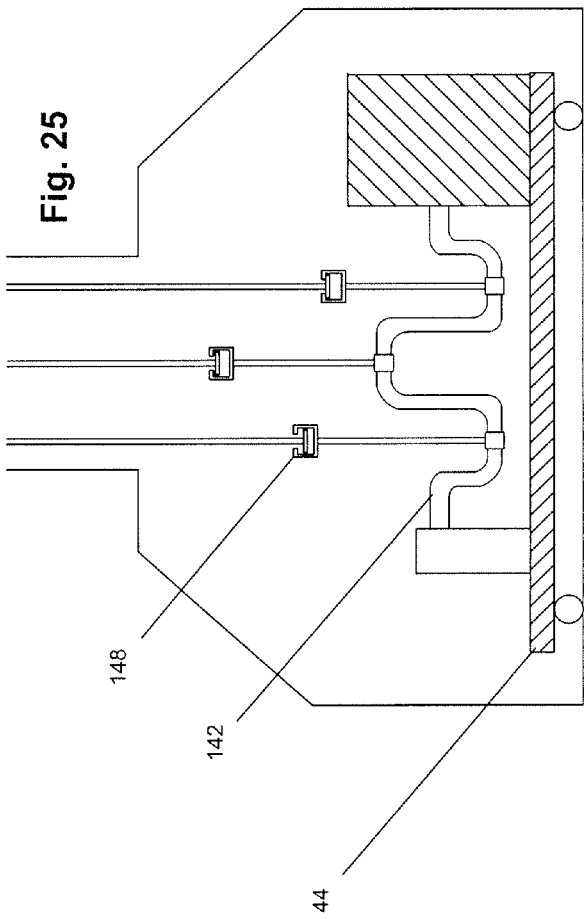
Fig. 25

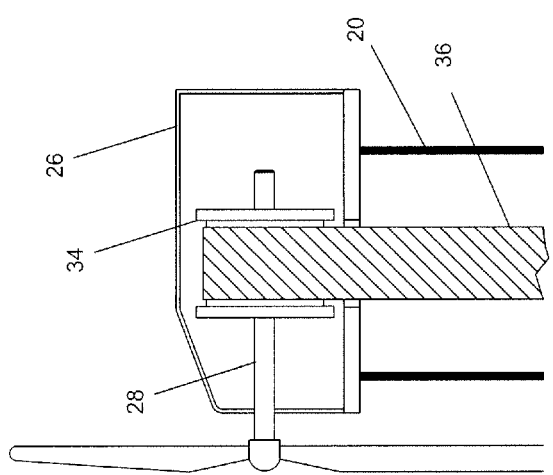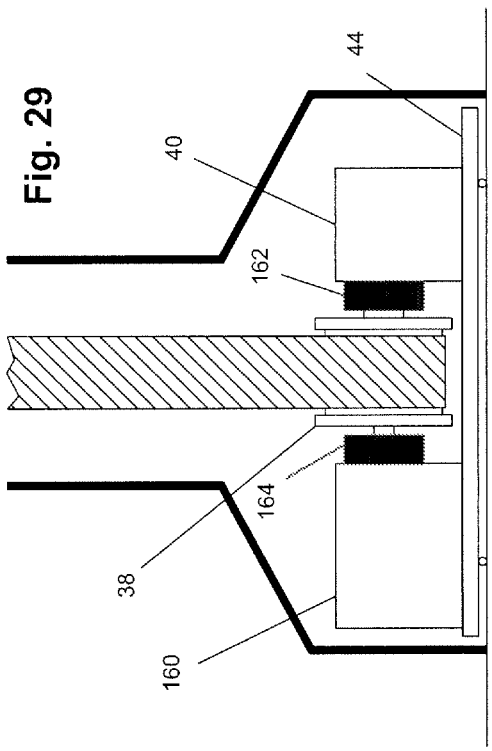
Fig. 29

WIND TURBINE WITH POWERED SYNCHRONIZATION SYSTEM

CROSS-REFERENCE TO RELATED APPLICATIONS

This application claims priority to U.S. Provisional Patent Application No. 61/271,406, filed Jul. 21, 2009, which is hereby incorporated by reference and made a part hereof.

FEDERALLY SPONSORED RESEARCH OR DEVELOPMENT

Not Applicable.

TECHNICAL FIELD

The present invention is related to the industry of alternative energy production and more specifically the industry of turbines for the generation of electricity from the power of the wind.

BACKGROUND OF THE INVENTION

Wind turbines are well known mechanical devices that have been used for hundreds of years to perform various types of mechanical work. In modern times the generation of electricity using wind turbines has developed into a large industry.

Referring to FIGS. 1-3, there is shown a traditional prior art turbine 10. Traditional turbines 10 have typically three rotor blades 12 fixedly mounted on a hub 14 rotating about a horizontal axis. The turbine is rotatably attached to a housing structure called the nacelle 15 which is located at the top of a high tower 16 in order to reach the stronger winds at higher altitudes. The nacelle 15 can rotate about the axis of the tower (the so-called yaw movement) in order to face the wind.

FIG. 3 is an expanded view of the nacelle and its internal components. The turbine typically rotates at low speed (about 10-15 rpm). This speed is typically too low to drive a conventional generator and therefore typically a gearbox 18 is inserted between the turbine and the generator 19, as shown in FIG. 3. Some modern turbines use a special generator that does not require a gearbox, a so-called direct drive generator. That is an attractive architecture in principle, because gearboxes are one of the most failure-prone components in turbines. However, direct drive generators are typically even larger, heavier and more expensive than conventional gearbox-driven generators, which renders this approach impractical in many cases, because modern turbines are already too top heavy.

The issue of excessive weight at the top of a very high and slender tower 16, generally over 100 meters, is one of the major problems in the wind industry. Weight impacts the cost of the tower, which has to be able to support the top-heavy architecture of the overall turbine system. This issue also impacts the cost and complexity of the components inside the nacelle 15, because they have to be designed to minimize weight and size, which leads to compromises that have caused widespread failures of gearboxes in the field.

Despite the efforts to design the components with minimum possible weight, the total weight of the nacelle has been escalating from about 100 tons in prior years to new levels approaching 500 tons in some cases because of the need to provide more power per turbine in order to make wind-generated electricity cost effective and competitive with fossil fuels.

With increasing weight, the cost of erecting a turbine has also increased because of the requirement to lift very heavy and bulky components to a high altitude and mount them on top of the tower 16. This task requires heavy duty cranes and similar equipment, which are not only very expensive, but are also very difficult to transport to the turbine site, further adding to the cost and complexity of manufacturing the turbine.

Another major issue with traditional wind turbines is the difficult and costly maintenance of the turbine. Maintenance personnel have to climb up extremely long ladders or have to be airlifted by helicopter to high altitudes under heavy wind conditions and often very low temperatures. Any significant repairs involving replacement of heavy components requires again bringing in the heavy cranes. Helicopters can be used in some instances, but this further increases the expense and risks. For off-shore turbines the difficulties are even further compounded. Some companies have built or are building special ships with giant cranes attached to them to be able to erect and maintain off-shore turbines, at extremely high expense. All these major difficulties at the end cause delays, downtime and invariably high expenses, which have to be passed on to the cost of wind-generated electricity.

The present invention addresses the above issues by removing the heavy components (transmission, generator, yaw motors, etc.) from the nacelle and relocating them at or near the bottom of the tower. The present invention provides a very innovative solution that makes it possible to locate the turbine at the high altitude required to take advantage of strong winds while at the same time providing a reliable and cost-effective approach.

The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention generally provides an improved wind turbine. In one embodiment, the wind turbine employs a cable transmission. In such an embodiment, the wind turbine has a rotor shaft which is coaxial with and fixedly attached to a large diameter drum at the top 22 of the tower 20. An equivalent drum is mounted at the bottom of the tower and rotatably supported by appropriate bearings. A high strength cable is would around the drums, connecting the two drums to each other in the form of a long closed loop. The rotation of the top drum causes an identical rotation of the bottom drum, transferring the mechanical energy to the bottom drum. The bottom drum is attached to a generator, which generates electricity and feeds it into a grid. In another embodiment, a belt transmission is used instead of a cable. These and other embodiments of the invention are described further herein, and will be readily apparent to a person of ordinary skill in the art in view of the present disclosure.

The embodiments described herein provide a turbine wherein the generator, gearbox and other major components are located at a lower altitude relative to the top of the tower, or even at ground level. As a result of the present invention, the tower is not as top heavy as conventional turbines and can be built more economically. Also, the components can be designed without a need to reduce cost, thereby likely making such components more reliable. And, maintenance of the present invention is much less expensive and less dangerous than with traditional turbines.

The erection of a turbine and all its associated costs, i.e., the erection of ancillary structures, the use of heavy duty cranes, and the transportation of such equipment to the site, constitute a major cost factor in a turbine project. These cost can be substantially reduced by using the solutions provided in the embodiments described herein.

Additionally, through the use of the concepts provided for in the embodiments herein, the components located at the bottom of the tower do not need to be optimized for weight and size in their design and manufacture. They can be made sturdy, reliable and inexpensive; no need for special high-strength, low-weight materials and complex low-weight and compact designs. Once weight is removed as a key design criteria, cost can be substantially reduced while simultaneously increasing reliability to levels not possible in prior art designs.

A further advantage of the embodiments herein is the possibility of eliminating the drive transmission, and directly driving the generator from the bottom drum. Such direct drive generally requires a large diameter generator in order to achieve the relatively high relative speed between the rotor and the stator needed for electricity generation. Such a large diameter is a problem when the generator is located on top of a high tower, because of weight, size and the difficulty of maintaining an accurate constant gap between rotor and stator in a large diameter light-weight generator. However, when the generator is placed at the bottom of the tower according to the present invention, weight and size are not a key issue anymore, and the generator can be designed and built in a sturdy and rigid way with all necessary reinforcements, surrounding structures and provisions to achieve a constant gap and reliable operation.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4a is a schematic view of one embodiment of the invention utilizing a cable drive;
FIG. 4b is a schematic view of one embodiment of the invention utilizing a belt drive;
FIG. 5a is a schematic view of another embodiment of the invention utilizing a cable drive;
FIG. 5b is a schematic view of another embodiment of the invention utilizing a belt drive;
FIG. 6a is a schematic view of another embodiment of the invention utilizing a cable drive;
FIG. 6b is a schematic view of another embodiment of the invention utilizing a belt drive;
FIG. 7a is a schematic view of another embodiment of the invention utilizing a cable drive;
FIG. 7b is a schematic view of another embodiment of the invention utilizing a belt drive;
FIG. 8a is a schematic view of another embodiment of the invention utilizing a cable drive;
FIG. 8b is a schematic view of another embodiment of the invention utilizing a belt drive;
FIG. 9a is a schematic view of the embodiment of FIG. 6a with a drive system;
FIG. 9b is a schematic view of the embodiment of FIG. 6b with a drive system;
FIG. 10a is a schematic view of another embodiment of the invention utilizing a cable drive;
FIG. 10b is a schematic view of another embodiment of the invention utilizing a belt drive;
FIG. 15a is a schematic view of an embodiment of the present invention with two top and two bottom drums utilizing cable drives;
FIG. 15b is a schematic view of an embodiment of the present invention with two top and two bottom drums utilizing belt drives;
FIG. 16 is a schematic view of another turbine drive system with two top and two bottom drums;
FIG. 17 is a schematic view of another embodiment of a turbine drive system;
FIG. 21 is a schematic view of another embodiment of the present invention utilizing three belts;
FIG. 24 is a schematic view of another embodiment of a turbine drive system utilizing crankshafts;
FIG. 25 is a schematic view of another embodiment of a turbine drive system utilizing crankshafts and pull rods;
FIG. 29 is a schematic view of another embodiment of a turbine drive system.

DETAILED DESCRIPTION

Figure 3:
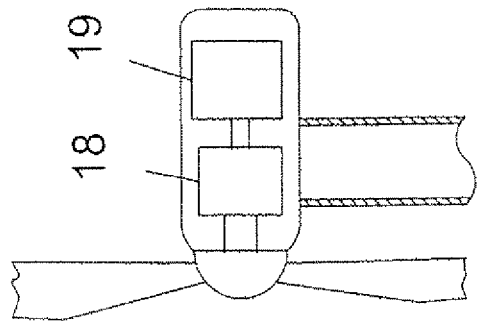
FIG. 3 is a partial blown up view of the turbine of FIG. 1.
Figure 2:
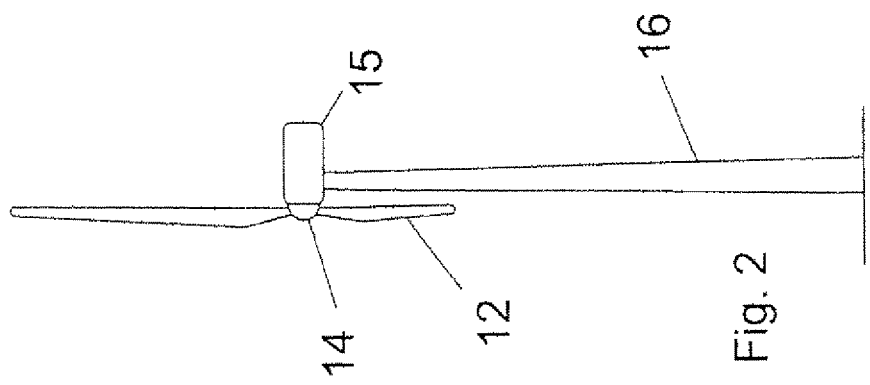
FIG. 2 is a side view of the turbine of FIG. 1.
Figure 1:
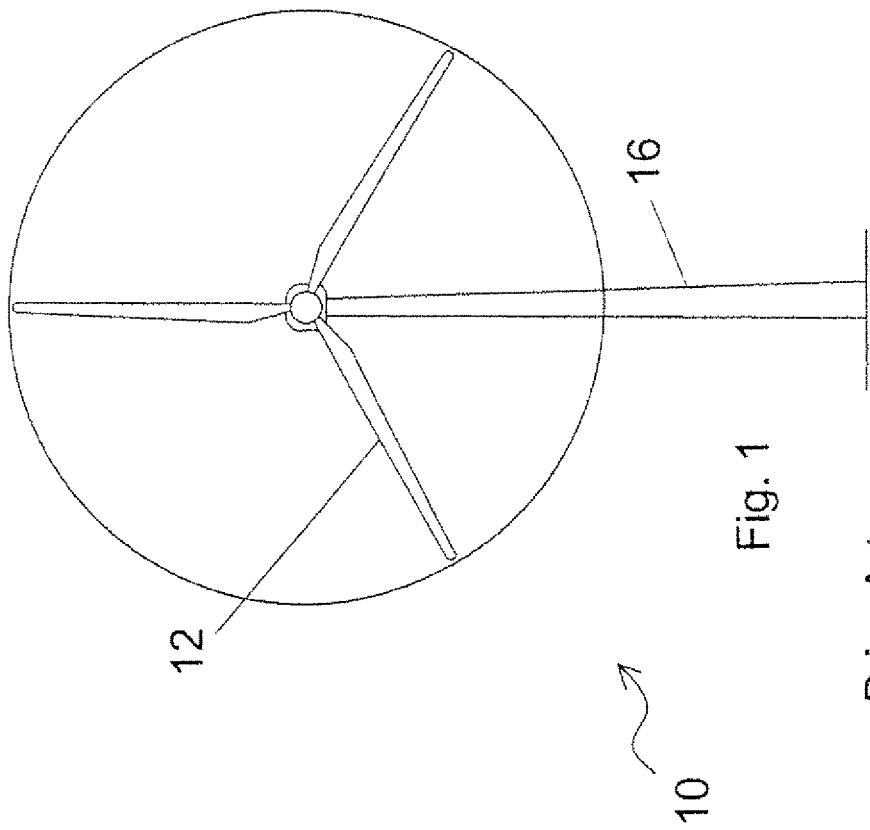
FIG. 1 is a front view of a conventional prior art turbine.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now to the drawings, and specifically to FIGS. 4a and 4b, there is shown one of the preferred embodiments of the present turbine system to generate electricity from wind energy, which is based on a tower 20 that is fixed in its position with respect to the ground and is therefore non-rotatable. The tower 20 has a top portion 22 and a bottom portion 24. Preferably, the tower has no cables or other supporting structure connecting the tower to the ground other than near its bottom portion 24. Additional supporting structure, such as a lattice or frame, connected toward the top portion 22 of the tower 20 is undesirable and may interfere with the operation of the turbine rotor 28. The tower 20 supports a nacelle 26 adjacent the top portion 22 of the tower 20. In this embodiment the nacelle 26 is rotatably attached adjacent the top portion 22 of the tower 20 and the nacelle 26 is able to rotationally yaw about the tower 20 pursuant to a yawing system. In another embodiment (not shown), the tower 20 may have a cross-section with an elongated dimension in a direction perpendicular to a longitudinal axis of the tower 20 to increase the tower's moment of inertia and strength against bending in that direction, as well as minimizing the wind forces against the tower 20.

The nacelle 26 supports a turbine rotor 28. In one embodiment the rotor 28 has a hub 30 and a plurality of blades 32 extending from and supported by the hub 30, however, alternate rotor configurations may be used without departing from the scope and spirit of the present invention. The nacelle 26 and rotor 28 are able to yaw about the tower 20 to orient the turbine rotor 28 in a desired direction relative to the wind. The blades 32 rotate the rotor 28, which in turn rotates or drives a top rotation transfer member 34. As is explained herein the top rotation transfer member 34 drives a power transfer member 36 inside the tower 20, which in turn drives a bottom rotation transfer member 38. In a preferred embodiment, the bottom rotation transfer member 38 is located inside the tower and substantially adjacent a bottom portion 24 of the tower 20. In a most preferred embodiment the power transfer member 36 is a flexible member, such as a cable or belt. The power transfer member 36 connects the top rotation transfer member 34 to the bottom rotation transfer member 38. The power transfer member 36 transfers power, i.e., wind energy captured by the turbine rotor 28, from the top portion 22 of the tower 20 to the bottom portion 24 of the tower 20 to allow the generator 40 associated with the turbine to be located at a bottom portion 24 of the tower 20. Accordingly, the generator 40 is mechanically connected to the bottom rotation transfer member 38. In one embodiment the bottom rotation transfer member or drum 38 is connected to a gearbox 42, which in turn is connected to the generator 40.

In one embodiment the top rotation transfer member 34 is preferably a high altitude top drum 34 located inside the nacelle 26. The bottom rotation transfer member 38 is preferably a low altitude bottom drum 38 that is located at or substantially near the bottom portion 24 of the tower. As explained above, the two drums 34, 38 are connected to each other via the power transfer member 36. In one embodiment, as shown in FIG. 4a, the power transfer member 36 is an endless loop cable 36 that wraps around the top rotation transfer member 34 and the bottom transfer member 38 to transmit torque/rotation from the top rotation transfer member/drum 34 to the bottom rotation transfer member/drum 38. In an alternate embodiment, as shown in FIG. 4b, the power transfer member 36 is a belt 36 that wraps around the top rotation transfer member 34 and the bottom transfer member 38 to transmit torque/rotation from the top rotation transfer member/drum 34 to the bottom rotation transfer member/drum 38.

As explained above, the generator 40 is mechanically connected to the bottom rotation transfer member 38. In a preferred embodiment having a non-rotatable tower 20, both the bottom rotation transfer member 38 and the generator 40 are connected to a turntable 44, which is part of a synchronization system. In this embodiment, an electric motor 46 may be connected to the nacelle 15 to yaw or rotate the nacelle 15 about the tower 20 axis to orient the turbine rotor 28 in a desired direction with respect to the wind. This is one example of a yawing system. Manual yawing via wind power may also be acceptable in certain situations. In a further preferred embodiment, the turntable 44 rotates synchronously with the yaw movement of the nacelle 26 about the tower axis to maintain alignment of the top rotation transfer member 34 and the bottom rotation transfer member 38. Typically one or more electric motors 46, such as those shown in FIGS. 9a and 9b, operate to rotate the turntable 44, either alone or in combination with a set of gears, similar to the way that typically yaw movement of the nacelle 26 is achieved. The powered synchronization system substantially synchronizes a rotation angle of the top rotation transfer member 34 with a rotation angle of the bottom rotation transfer member 38, thus maintaining a desired alignment between the top rotation transfer member 34 and the bottom rotation transfer member regardless of the yawing angle of the nacelle 15. Optionally, the turntable 44 may be equipped with the ability to be elevated and/or lowered to adjust the tension of the connection cables or column components. This feature can be achieved in different ways, including a hydraulic system, however, alternative lifting means are available as well.

Referring to FIGS. 4a-b, which embodiment employs a gearbox 42, the function of the gearbox 42 is to step up the rotational speed received from the bottom rotation transfer member 38 because the generator 40 preferably requires a high relative speed between its rotor and stator to generate electricity. Accordingly, a gearbox 42, typically with a ratio of about 1:100, provides that requisite high relative speed to operate the generator 40.

Figure 23:
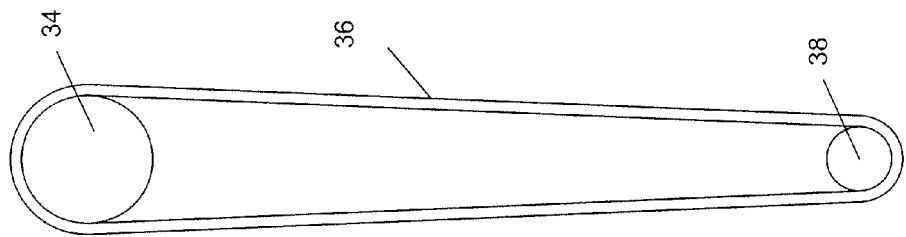
FIG. 23 is a schematic view of one embodiment of a turbine drive system utilizing different size drums.

As shown in FIGS. 4a-b, in one embodiment the top rotation transfer member 34 and bottom rotation transfer member 38 have very similar or identical diameters. It is also possible to make the diameters of the top rotation transfer member 34 and bottom rotation transfer member 38 different. For example, as shown in FIG. 23, by making the diameter of the bottom rotation transfer member 38 smaller than the diameter of the top rotation transfer member 34, a speed increase in the bottom rotation transfer member 38 is achieved, which can be used to reduce the necessary gear ratio in gearbox 42.

Referring to FIGS. 5a-b, there is a shown a variation of the embodiment of FIGS. 4a-b wherein the gearbox 42 has been eliminated and the generator 40a is of the direct-drive type. This direct-drive type generator 40a has a larger diameter than the generator 40 of the embodiment of FIGS. 4a-b. The larger diameter of generator 40a is required to provide the high relative speed between the rotor and stator needed by the generator 40 when the input speed is less because a stepped-up gearbox 42 is not utilized. For reference, the embodiment shown in FIG. 5a utilizes an endless loop cable 36 to transmit torque from the top drum 34 to the bottom drum 38, whereas the embodiment shown in FIG. 5b utilizes a belt 36 to transmit torque from the top drum 34 to the bottom drum 38.

Instead of using a separate bottom rotation transfer member 38 and generator 40 as shown in the embodiments of FIGS. 4-5, the embodiment of FIG. 6a disclose a generator 40b that has been integrated into the bottom rotation transfer member 38. In this embodiment the bottom rotation transfer member 38 serves both as a pulley for the power transmission cable 36 and as the rotor for the generator 40b, rotating about the generator stator to produce electricity. Additionally, the embodiment of FIGS. 6a-b does not have a gearbox. This embodiment has an advantage that the gearbox can be eliminated, because the rotation transfer members can be designed with a diameter large enough to provide the high relative speed between rotor and stator needed for electricity generation. It is desirable to use large diameters for the rotation transfer members, in order to provide sufficient contact area and avoid unwanted slippage, and also to avoid excessive bending of the cables which could lead to cable fatigue. By choosing relatively large diameters for the rotation transfer members 34, 38, these objectives can be simultaneously achieved in this embodiment. For reference, the embodiment shown in FIG. 6a utilizes an endless loop cable 36 to transmit torque from the top drum 34 to the bottom drum 38, whereas the embodiment shown in FIG. 6b utilizes a belt 36 to transmit torque from the top drum 34 to the bottom drum 38.

In one embodiment, as shown in FIGS. 4-6 and 9, the bottom rotation transfer member 38 with its integrated generator 40b is located on top of turntable 44, which rotates synchronously with the yaw rotation of the nacelle to maintain alignment and orientation of the top and bottom rotation transfer members 34, 38 relative to each other at all times the turntable 44 supports the bottom rotation transfer member 38 and the generator 40. In one embodiment, position sensors 50 report the position of the nacelle 26 and the turntable 44 to the central turbine controller, which constantly monitors these and all other components of the turbine, and in combination with the motors 46 causes the turntable 44 to rotate to follow and match the position of the nacelle 26 at all times. In one embodiment the combination of the rotation motors 46, sensors 50, along with the necessary bearings, etc., comprises a powered synchronization system to substantially synchronize a rotation angle of the top rotation transfer member 34, and preferably the nacelle 26 as well, with a rotation angle of the bottom rotation transfer member 38, thus maintaining a desired alignment between the top rotation transfer member 34 and the bottom rotation transfer member 38 regardless of the yawing angle of the nacelle 26.

Referring now to FIGS. 9a-b, one embodiment to synchronize the top rotation transfer member 34 and bottom rotation transfer member 38 is based on a redundant architecture that would include some or all of the following components/features: a. multiple redundant sensors 50 (which can be mechanical, electrical, electronic, magnetic or of any other type). In one embodiment the sensors 50 comprise a first sensor 50 to monitor the angular position of the turntable 44, and a second sensor 50 to monitor the angular position of the nacelle 15, the sensors 50 providing signals to the electronic control system that coordinates rotation of the yawing system with the rotation of the turntable 44 to substantially avoid misalignment and to stop the turbine system if any relevant misalignment is detected; b. top and bottom actuators 46, such as electrical yaw motors 46, that can be actuated to rotate the nacelle 26 and the turntable 44 simultaneously or independently from each other if necessary to maintain the angular synchronization of the top and bottom rotation transfer members 34, 38, and of course this syncs the yawing of the nacelle 15 with the bottom rotation transfer member 38; c. a set of backup batteries (not shown in FIGS. 9a-b) in the nacelle 26 and at the bottom portion 24 of the tower 20 to guarantee that there will always be power available to yaw the nacelle 26 and/or rotate the turntable 44 to address any need that may come up, even if power from the grid is not available; d. a set of brakes (not shown in FIGS. 9a-b) for the nacelle 26 and for the turntable 44 that will instantly stop the nacelle 26 yaw and the turntable 44 rotation if any lack of synchronism is detected (which would be monitored constantly by redundant sensors 50), wherein the brakes can also be actuated from an emergency power source such as the previously mentioned backup batteries, a compressed air tank or other energy storage device; e. a central controller with appropriate programming to address any failure mode by using the above resources (redundant sensors, brakes, independent motors and emergency energy storage). For reference, the embodiment shown in FIG. 9a utilizes an endless loop cable 36 to transmit torque from the top drum 34 to the bottom drum 38, whereas the embodiment shown in FIG. 9b utilizes a belt 36 to transmit torque from the top drum 34 to the bottom drum 38. The turbine system also includes a controller or electronic control system (ECS). This system is based on an electronic controller, such as a programmable logic controller or a computer, with the purpose to process input information (such as signals from tower position sensors, turntable position sensors, blade angular position sensors, main shaft speed sensors, temperature sensors, mechanical stress sensors, noise and vibration sensors, pressure sensors, fluid level sensors in the equipment, voltage and counter-torque in the grid connection, wind speed and direction sensors, and others) using an algorithm, logic or program resident in the ECS to generate output signals that govern the behavior of the turbine system, such as the rotation of the tower, rotation of the turntable, rotation of the blades using the pitch system, shutdown of the system in case of emergencies or excessive misalignments an others.

Unlike the embodiment of FIGS. 9a-b, the embodiment of FIGS. 10a-b illustrates a synchronization mechanism that does not require a turntable at the bottom portion of the tower 20. Instead, a series of gears are utilized to transfer the power from the rotor 28 to the top rotation transfer member 34. Further, in this embodiment the top and bottom rotation transfer members 34, 38 will maintain synchronized at all rotational angles of the nacelle 26 because the top and bottom rotation transfer members 34, 38 remain fixed in the tower 20. In one embodiment a first bevel gear 74 is connected to the rotor 28 and drives a mating second bevel gear 76 to transfer the flow of power from the rotor 90° while at the same time substantially increasing the speed. Second bevel gear 76 drives third bevel gear 78 which drives gear 80 connected to the top rotation transfer member 34, and which also transfers the flow of power by 90° while at the same time substantially increasing speed. When the nacelle 26 turns in its yaw rotation, gear 74 can rotate around gear 76 wile the top rotation transfer member 34 remains stationary. Therefore this arrangement does not disturb the alignment and relative position of the power transmission rotation transfer members 34, 38. For reference, the embodiment shown in FIG. 10a utilizes an endless loop cable 36 to transmit torque from the top drum 34 to the bottom drum 38, whereas the embodiment shown in FIG. 10b utilizes a belt 36 to transmit torque from the top drum 34 to the bottom drum 38.

Another method to maintain synchronization between the top and bottom rotation transfer members 34, 38 is shown in the embodiment of FIGS. 7a-b. In this embodiment a synchronization shaft 52 is utilized to join the top and bottom rotation transfer members 34, 38. In one embodiment the synchronization shaft 52 has pinions 54 at each end of the shaft 52. The top pinion 54 meshes with a top ring gear 56 connected to the support member for the top rotation transfer member 34, and the bottom pinion 54 meshes with a bottom ring gear 58 connected to the support member for the bottom rotation transfer member 38. Accordingly, as either the nacelle 26 or turntable 44 is rotated, the other of the nacelle 26 or turntable 44 will be simultaneously rotated to maintain synchronization. While only one synchronization shaft 52 is illustrated in FIGS. 7a-b for simplicity, in practice it is conceivable to use a plurality of synchronization shafts 52. For reference, the embodiment shown in FIG. 7a utilizes an endless loop cable 36 to transmit torque from the top drum 34 to the bottom drum 38, whereas the embodiment shown in FIG. 7b utilizes a belt 36 to transmit torque from the top drum 34 to the bottom drum 38.

Another embodiment of the turbine system having a generator at the bottom portion of the tower, whereby the top rotation transfer member 34 and the bottom rotation transfer member 38 are synchronized, is shown in FIGS. 8a-b. In this embodiment, the entire tower 20 is able to rotate about its longitudinal axis. Additionally, in this embodiment the nacelle 26 cannot rotate with respect to the tower 20, and instead is fixedly attached adjacent a top portion 22 of the tower 20 without the possibility of the nacelle 26 rotationally yawing about the tower 20. In one version of this embodiment, the bottom of the tower 20 is fixedly attached to a supporting platform 60. Additionally, the bottom rotation transfer member 38 and a generator 40 connected to the bottom rotation transfer member 38 are also supported by the supporting platform 60. As shown in FIGS. 8a-b, the supporting platform 60 can rotate on the tower rotation mechanism 62 about the tower's longitudinal axis in order to orient the turbine rotor 28 in the desired direction with respect to the wind. In such an embodiment the tower 20 will always rotate synchronously with the supporting platform 60 and the nacelle 26 because the supporting platform 60 and the nacelle 26 are fixedly connected to the tower 20. The supporting platform 60 is rotatably supported by the tower rotation mechanism 62 through axial and radial bearings in the foundation 68. A motor 70 located at the bottom of the tower 20 is mated to a ring gear 72 connected to the supporting platform 60 to rotate the supporting platform 60 as desired, along with tower 20 and nacelle 26. This approach is facilitated by the fact that the tower 20 in the embodiments disclosed has a much lower weight than prior art conventional towers because it has to carry only a fraction of the weight of traditional towers. For reference, the embodiment shown in FIG. 8a utilizes an endless loop cable 36 to transmit torque from the top drum 34 to the bottom drum 38, whereas the embodiment shown in FIG. 8b utilizes a belt 36 to transmit torque from the top drum 34 to the bottom drum 38. In such an embodiment where the entire tower 20 rotates, a controller or an electronic control system may be employed. The control system utilizes an electronic controller, such as a programmable logic controller or a computer, with the purpose to process input information (such as signals from tower position sensors, blade angular position sensors, main shaft speed sensors, diverse speed sensors for components of the driveline, diverse temperature sensors, mechanical stress sensors, noise and vibration sensors, fluid pressure sensors and level sensors, voltage and counter-torque in the grid connection, wind speed and direction sensors, and others) using an algorithm, logic or program resident in the control system to generate output signals that govern the behavior of the turbine system, such as the rotation of the tower, rotation of the blades using the pitch system, shutdown of the system in case of emergencies or excessive misalignments, etc.

Another aspect of the wind turbine system of the present invention is a blade pitch mechanism to rotate each rotor blade 32 about its longitudinal axis so as to orient or rotate the rotor blades 32 in a desired angular position with respect to the wind. Adjusting the pitch of a rotor blade 32 is important because the angular orientation of the blade 32 determines the angle of attack and the amount of lift developed on the blade 32, which significantly affects the efficiency of the energy capture by the blade 32. In preferred embodiments it is important to control the angular position of each rotor blade 32 individually, because the large dimensions of a turbine rotor blade 32, e.g., most modern turbines have a rotor diameter of 100 meters, expose the different blades 32 on the same rotor 28 to different wind intensities and different conditions. At any point in time, in a three-bladed rotor, blades one, two and three are exposed to different conditions; for instance, one of the blades may be pointing upwards and therefore exposed to maximum winds, while another blade may be pointing downwards and exposed to lower wind speed and also to the dam effect of the tower. Individual blade pitch control makes it possible to adjust the pitch of each individual blade according to the conditions it is experiencing. Those conditions can be monitored by embedded strain gages or other sensing devices in the blades 32, and the pitch can be adjusted according to the sensed values, avoiding excessive stresses or other possible deleterious effects.

Figure 11:
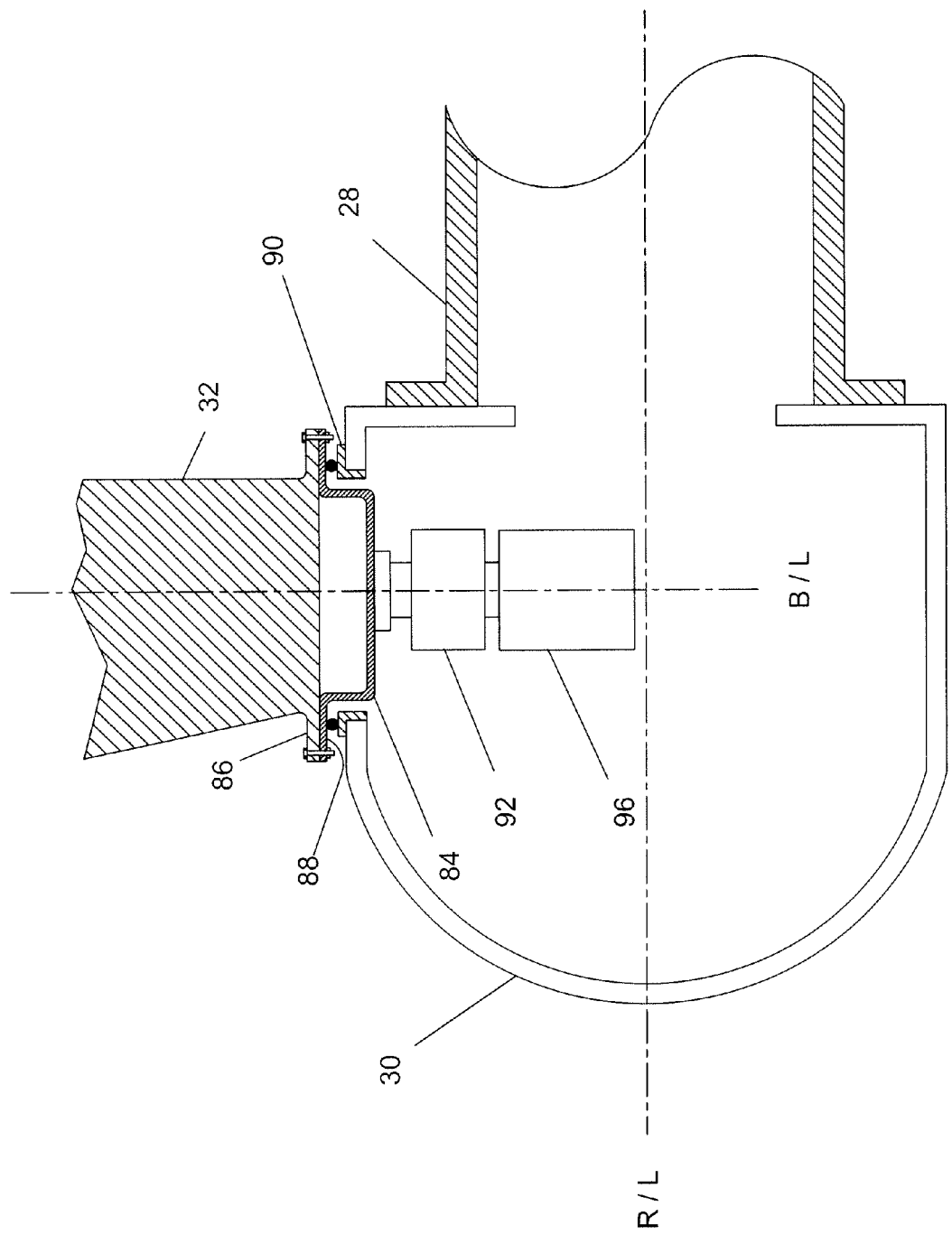
FIG. 11 is a partial cross-sectional view of one embodiment of a pitch mechanism for the turbine.
Figure 12:
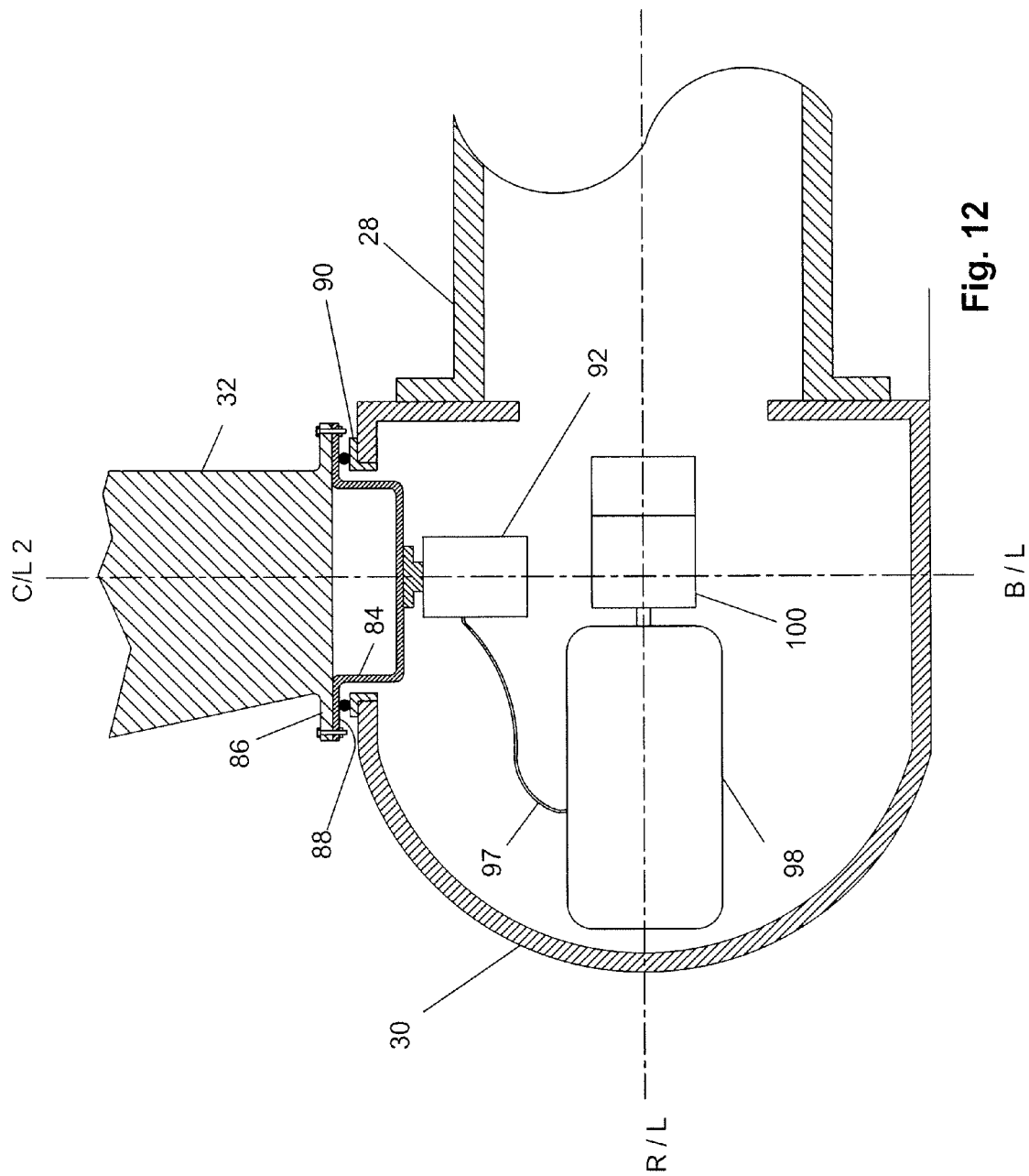
FIG. 12 is a partial cross-sectional view of another embodiment of a pitch mechanism for the turbine.

Referring to FIGS. 11 and 12, which illustrate partial cross-sectional views of a turbine rotor assembly, there are shown two embodiments of the pitch mechanism. In each of FIGS. 11 and 12 only one blade 32 is illustrated. As shown in the embodiment of FIG. 11, each rotor mechanism comprises a rotor shaft 28 and a hub 30. The hub 30 is fixedly connected to the rotor shaft 28 and rotates with the rotor shaft 28. In standard rotor assemblies the blades 32 are fixedly connected to the hub 30. Accordingly, in traditional assemblies the wind rotates the blades 32, causing the connected hub 30 and rotor shaft 28 to rotate with the blades 32 about the longitudinal axis ($R_L$) of the rotor shaft 28. In the present embodiment, however, each blade 32 is rotatingly connected to the hub 30, and each blade 32 able to be controllingly rotated about a longitudinal axis ($B_L$) of each blade 32. To accomplish such pitch rotation of each blade about its longitudinal axis ($B_L$), each blade 32 is fixedly connected to a separate shaft 84 which can rotate about the longitudinal axis ($B_L$) of the specific blade 32 of which it is attached to. In one embodiment the blade 32 has a flange 86 which is secured to a flange 88 of the shaft 84. Shaft 84 is rotatingly supported by a bearing 90 positioned between the flange 86 of the shaft 84 and the hub 30, thereby allowing the blade 32 to be controllingly rotated. The shaft 84 is further connected to an actuator 92 which operates to rotate the shaft 84 and thus also rotate the blade 32 about the longitudinal axis ($B_L$) of the blade 32 as desired. In the embodiment shown in FIG. 11 the actuator 92 comprises an electric motor 92. The actuator 92 is fixed to the hub 30 with a bracket 94 such that the pitch mechanism rotates with the hub 30. Because of the relatively high speed of the electric motor compared to relatively low speed of rotation required for the blade 32, a speed reducer 96 is placed between the motor 92 and the shaft 84. Bracket 94 secures the speed reducer 96 and actuator 92 to the hub 30 structure. The speed reducer 96 can be a separate gear system with the required ratio, or it can be integrated into the motor 92. One of the advantages of the disclosed pitch mechanism is that all the components are contained inside the hub 30 and rotate along with the hub 30.

In an alternate embodiment of the pitch mechanism, instead of utilizing an electric motor, an air motor or air actuator 92 can be utilized as shown in FIG. 12. In this embodiment the actuator 92 is an air actuator 92 which rotatingly drives shaft 84. Bracket 94 connects the air actuator 92 to the hub 30. The air motor or air actuator 92 can be rotary mechanism such as a vane motor, or it can be a linear device such as an air cylinder, equipped with a crank mechanism to convert the linear movement of the air piston into a rotary movement. In a preferred embodiment of this alternate embodiment, air pressure line 97 supplies pressurized air to the air motor 92. The compressed air is provided by the reservoir pressure tank 98, which accumulates the pressurized air supplied by compressor 100. Another possible embodiment of this solution can be achieved by placing the compressor and/or the tank outside the hub, for instance, in the nacelle or even at the bottom of the tower. However, that would generally require a dynamic airtight connection between the nacelle, which is stationery, and the hub, which rotates. That can be achieved with a sealed dynamic air connector, such as the ones used to provide pressurized air to rotary devices in manufacturing equipment, however, it is not preferred because such dynamic connectors may have longevity issues and may start leaking over time.

Another variation of the pitch mechanism is to utilize hydraulic actuators instead of air motors. The hydraulic components would be a hydraulic motor and a hydraulic pump to provide the pressurized oil. The hydraulic components can be preferably located inside the hub, or alternatively outside the hub, such as in the nacelle.

Figure 13:
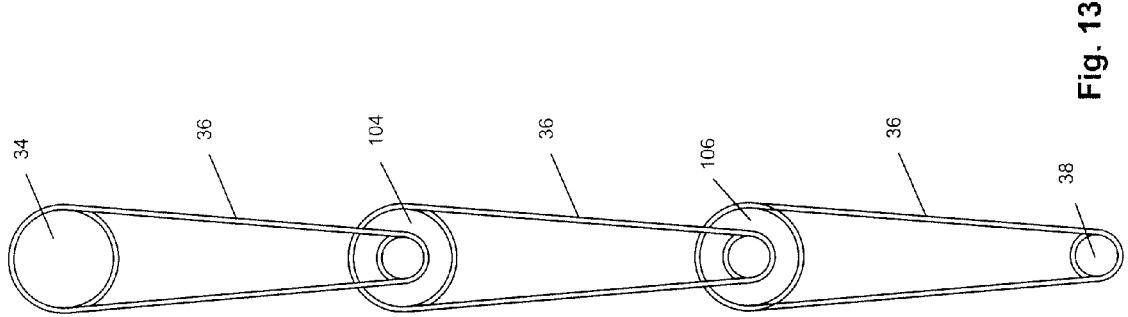
FIG. 13 is a schematic view of a turbine drive system.

Referring back to the power transfer between the top rotation transfer member 34 and the bottom rotation transfer member 38, an alternative embodiment of the cable drive is shown in FIG. 13. In this embodiment intermediate idler rotation transfer members 104 and 106 are provided between the top rotation transfer member 34 and the bottom rotation transfer member 38. Each idler rotation transfer member has two different sections: one with a large diameter and another one with a smaller diameter. The cables connect the upper larger diameter with the lower smaller diameter, providing a step-up ratio at each idler. The total step-up ratio equals the multiplication of all ratios. The advantage of this architecture is that with the appropriate number of idlers a high total ratio can be achieved, thereby either eliminating the need for a gearbox 42 at the bottom 24 of the tower 20 or potentially reducing the ratio required for the gearbox 42. The embodiment shown in FIG. 13 is not limited to a cable transmission as shown in FIG. 13, as it can be used with a belt transmission as shown in other embodiments herein.

Figure 14:
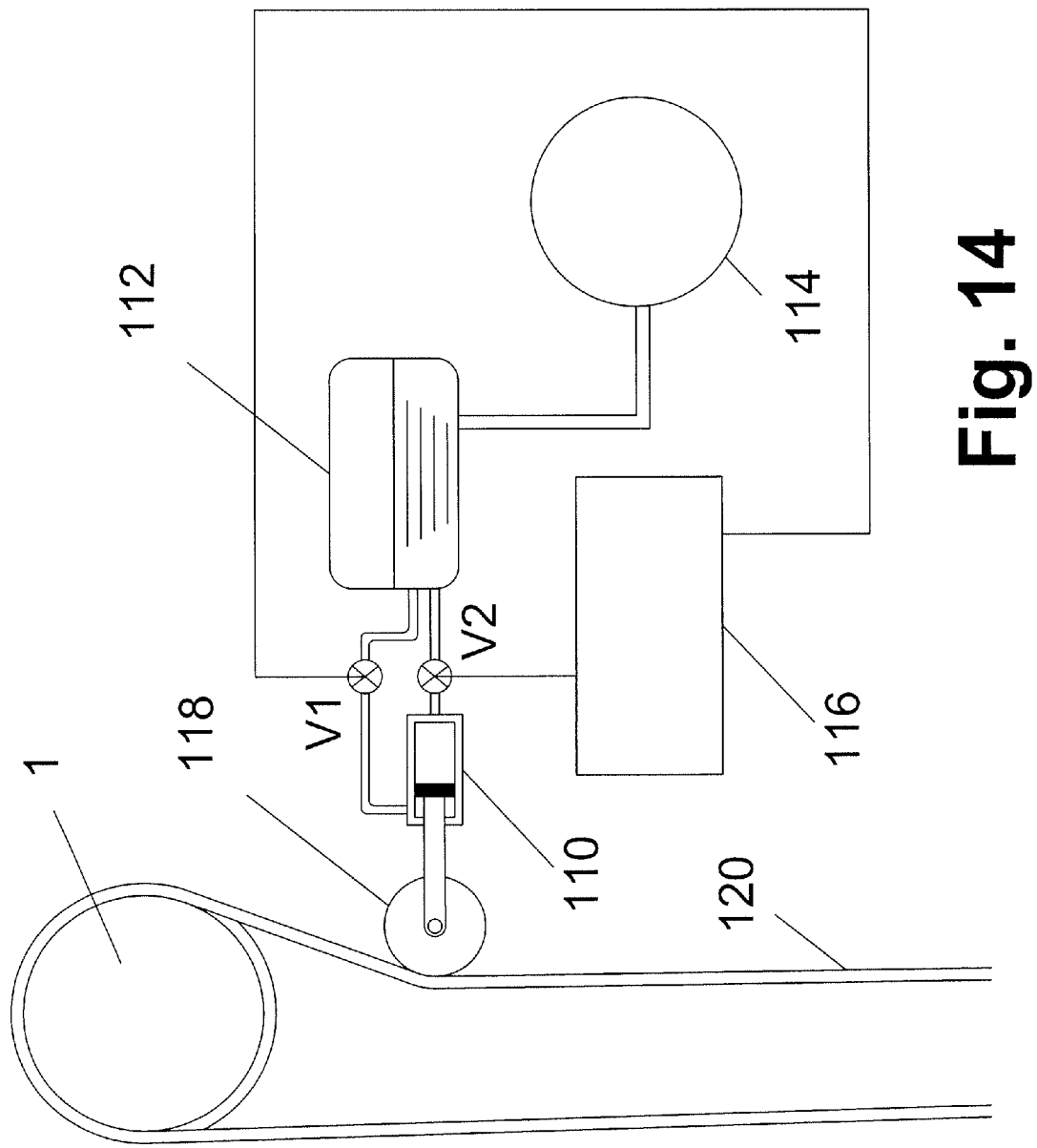
FIG. 14 is a schematic view of an idler for a turbine drive system.

Another tensioning system which can be used to maintain proper tension in the cable drive system, as well as to increase wrap to maximize torque is shown in FIG. 14. An advantage of this system is that it can be used to very quickly reduce torque and allow some slippage in emergencies or during unusual load situations, such as a sudden gust of wind that could otherwise create excessive stresses and break components of the turbine's drive train. In this tension system a hydraulic piston 110 receives pressure from an accumulator 112 which accumulates the pressure generated by pump 114. A controller 116 controls the opening and closing of valves V1 and V2, which cause the piston 110 to extend or retract, thereby causing tensioner 118 to engage or disengage the cable 120. In case of a sudden excessive load, the tensioner 118 can be almost instantaneously retrieved to provide slack in the cable 120, allowing momentary slippage to protect components that could otherwise be damaged. Of course it is also possible to use other actuators to actuate the tensioner 118, such as electric motors, solenoids, stepper motors, air motors and others. Further, the embodiment shown in FIG. 14 is not limited to a cable transmission as shown in FIG. 14. It can also be used with a belt transmission as shown in other embodiments herein.

As shown in FIGS. 15*a-b*, multiple sets of top rotation transfer members 34, bottom rotation transfer members 38 and flexible power transfer members 36 can be used instead of a single set of such members. This type of arrangement can provide redundancy advantages. The two cables 36*a* and 36*b* can be designed and dimensioned so that each one of them is able to carry the complete torque of the turbine. Accordingly, if one of the power transfer members 36*a* breaks or needs repairs, the turbine can continue operating with the remaining power transfer member 36*b*. For reference, the embodiment shown in FIG. 15*a* utilizes an endless loop cable 36 to transmit torque from the top drum 34 to the bottom drum 38, whereas the embodiment shown in FIG. 15*b* utilizes a belt 36 to transmit torque from the top drum 34 to the bottom drum 38. Additionally, the embodiment of FIG. 21 illustrates a turbine system employing three belts 36 as the power transfer members 36 in the system.

FIG. 16 illustrates a variation of the embodiment of FIG. 15, wherein the generator 40*b* has been integrated into the bottom rotation transfer member 38 (see also the embodiment of FIG. 6). Like the embodiment of FIG. 6, in this embodiment the bottom rotation transfer member 38 serves both as a pulley for the power transmission cable 36 and as the rotor for the generator 40*b*, rotating about the generator stator to produce electricity.

Another optional feature that can be applied to this and any other of the embodiments is also shown in FIGS. 15*a-b*. Specifically, a starter actuator 122, which is a typically an electric motor, although a hydraulic or air motor can be used as well, is utilized to turn the turbine rotor 28 when the wind is too slow to start the rotation of the turbine rotor 28. By running the turbine rotor 28 even at low speed for at least a number of revolutions, the starting inertia can be overcome because the lubricants and mechanism may be warmed up facilitating a lower cut-in wind speed, which can be very important for the financial performance of the wind turbine. This is an important issue, because in an effort to increase power output from wind, the industry has been dramatically increasing rotor size, and concurrently, the size and weight of all driveline components in the nacelle. As a result, the wind cut-in speed, i.e., the minimum wind velocity needed to start rotation of the turbine, has been going up. In many areas with low winds there are extended periods of time where the wind turbines remain idle. The above embodiment provides an auxiliary motor 122 that can be used as a starter motor to start rotation of the turbine with external power, such as power from the grid or any other source of power, when the wind is too low to start rotation. As soon as the inertial forces are overcome and the lubricants start flowing and slightly warming up, often a significant factor in cold locations, the auxiliary motor 122 can be turned off and the wind can take over. The auxiliary motor 122 may allow many turbines to start producing under conditions where otherwise they would be just standing by, waiting for more favorable winds. A clutch system (not shown) can be used to ensure decoupling of the auxiliary motor 122 as soon as the wind can take over, at which point the auxiliary motor 122 can be turned off. Alternately, the generator 40 itself can be designed so that it can also function as a startup motor and thus the starter motor function can be built into the generator, if that is more cost-effective than having a separate auxiliary motor. The auxiliary motor 122 may also require a transmission (not shown) to reduce speed to the low-speed, high-torque condition needed for starting the rotor. This transmission can be either a separate auxiliary transmission, for occasional use, or the main transmission at the bottom portion of the tower.

The embodiment of FIG. 17 illustrates a method to increase the torque that can be transmitted by the rotation transfer members and to reduce the potential for slip. In this embodiment lateral idler pulleys 126 increase the wrap angle on the top and bottom rotation transfer members significantly. These idler pulleys 126 can also be used for tensioning purposes if they are mounted in a movable arrangement.

Figure 18:
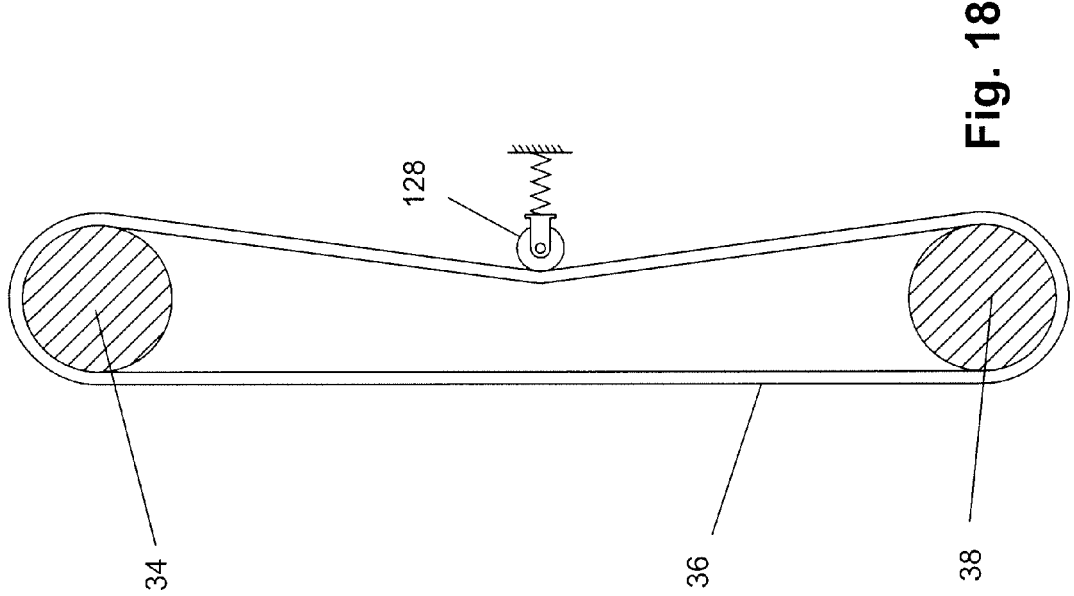
FIG. 18 is a schematic view of another embodiment of a turbine drive system employing an idler roller.

Another cable transmission schematic is shown in FIG. 18. In this embodiment a tensioner 128 is utilized to reduce slack in the power transmission cable and simultaneously increases the wrap-around angle of the cable around the rotation transfer members 34, 38, which increases friction and contributes to the elimination of slippage between cable and rotation transfer members. The tensioner 128 may be an idler pulley that can be actuated by appropriate springs, by a hydraulic mechanism or by other mechanical means. The tensioner 128 can be optionally monitored and controlled by the turbine controller, which through appropriate sensors can monitor the position of the cable and the amount of slack and then react by displacing the tensioner 128 to a position that eliminates the slack.

Figure 19:
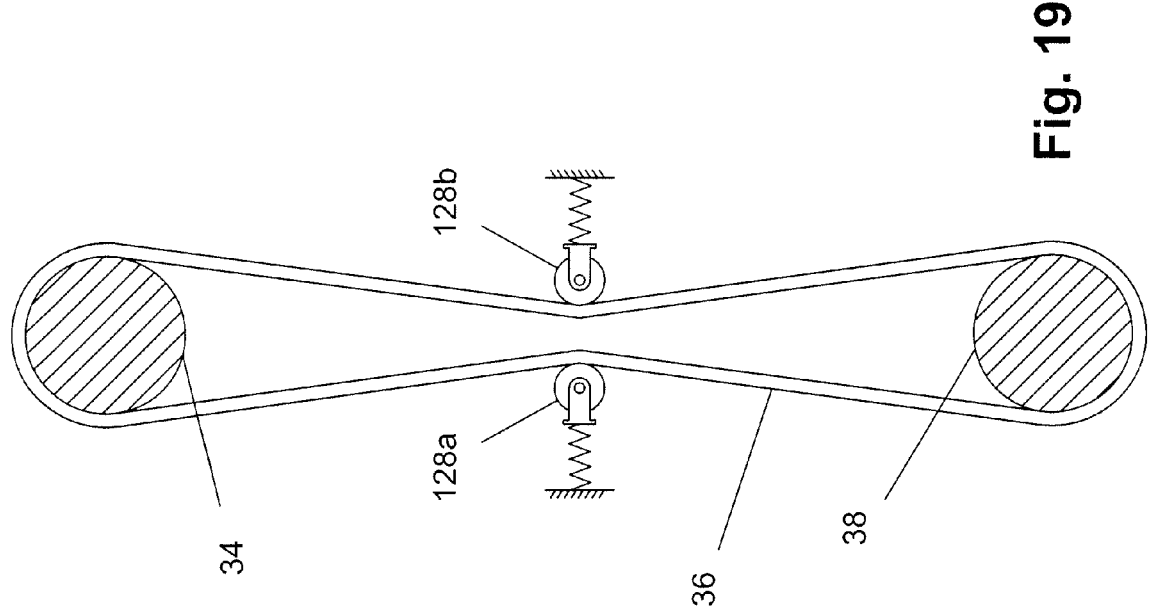
FIG. 19 is a schematic view of another embodiment of a turbine drive system employing two idler rollers.

Similarly, the embodiment of FIG. 19 shows a schematic view of the cable transmission utilizing dual tensioners 128*a* and 128*b*. The dual tensioners 128*a* and 128*b* increase the wrap-around angle of the cable around the rotation transfer members 34 and 38, which increases friction and contributes to the elimination of slippage between cable and rotation transfer members. Additionally, the availability of tensioners on both sides of the cable loop is useful if the driver-driven relationship of the rotation transfer members 34, 38 is temporarily reversed, which can happen if for instance the wind suddenly decreases and the bottom rotation transfer member 38 has enough inertia to become the driver rotation transfer member for a brief period of time. The role reversal of the rotation transfer members could temporarily create a slack situation in the cable, which the dual tensioner would rectify.

Figure 20:
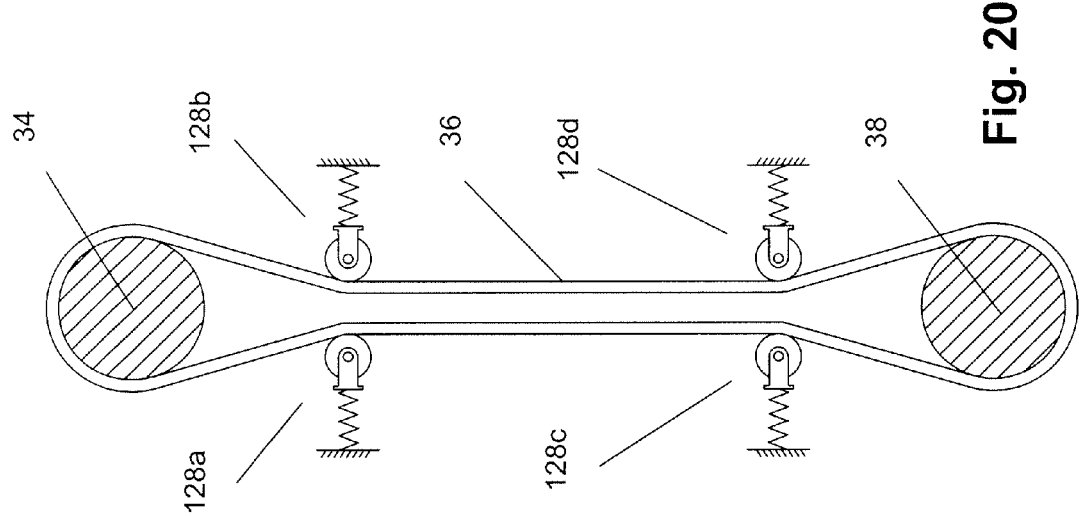
FIG. 20 is a schematic view of another embodiment of a turbine drive system employing four idler rollers.

Referring to FIG. 20, this embodiment illustrates a schematic view of a cable transmission having multiple dual tensioners 128*a*, 128*b*, 128*c*, 128*d*, which in certain cases may be desirable not just for tensioning purposes but also for alignment of the cables and avoidance of vibrations. While various tensioners have been described and shown in combination with a cable transmission drive, it is understood that similar tensioners may be utilized with a belt drive to keep the belt tight, provide belt alignment and eliminate possible vibration or oscillation of the belt. By quickly withdrawing and reducing the tension, such tensioners can also be used to protect against sudden wind gusts that otherwise could damage mechanical components of the drive train.

Figure 22:
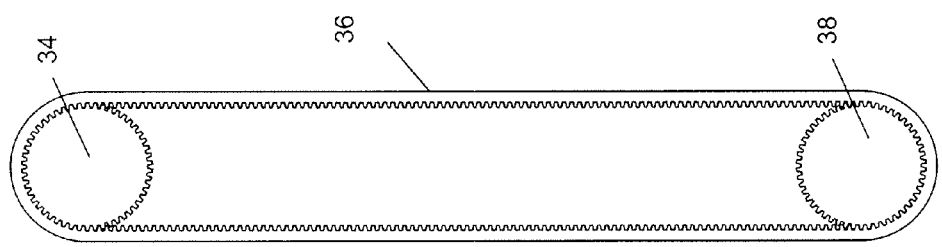
FIG. 22 is a schematic view of one embodiment of a turbine drive system utilizing a timing belt.

Referring to FIG. 22, this embodiment discloses a power transfer belt 36 that can be of the positive engagement type, such as a timing belt, used with a timing pulley to provide higher torque transmission capacity. In this embodiment, the power transfer belt 36 has a first set of mating members and the pulley, which could be the top or bottom drums 34, 38, has a second set of mating members that mate with the first set of mating members to transmit rotation from the top rotation transfer member to the bottom rotation transfer member through positive engagement of the power transfer member 36 with the rotation transfer members 34, 38. An alternate of the embodiment to the timing belt/timing pulley is a chain and gear arrangement.

As shown in FIG. 23, the lower rotation transfer member 38 can be of a different diameter than the upper rotation transfer member 34. Utilizing a smaller diameter at the bottom rotation transfer member 38 as shown in FIG. 23 creates a stepped-up transmission ratio from top to bottom, which is generally desirable in order to provide a higher input speed to the generator 40.

FIG. 24 illustrates another embodiment, wherein the wind energy is transferred from the rotor 28 through a top crankshaft 140 to a bottom crankshaft 142 via cables 144. In this embodiment the top rotation transfer member 34 comprises a first crankshaft 140 connected to and driven by the turbine rotor 28, and wherein the bottom rotation transfer member 38 comprises a second crankshaft 142 connected to the generator 40. A minimum of 3 throws in the crankshaft is recommended for this embodiment to ensure smooth transmission of the torque. Preferably, the crankshaft should have its throws at 120 degrees from each other. As explained above with alternate embodiments, a turntable 44 may be employed to synchronize the bottom crankshaft 142 with the yaw of the nacelle 26.

Figure 26:
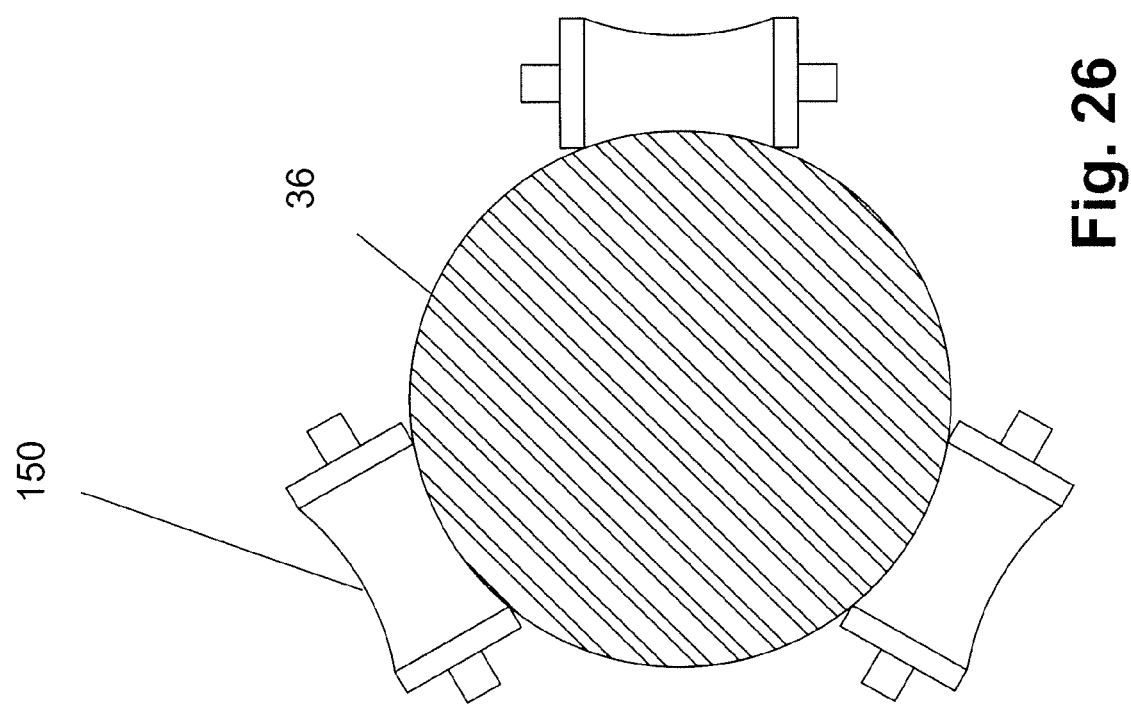
FIG. 26 is a schematic top view of a pull rod of FIG. 25.

Instead of employing cables 144 used in the embodiment of FIG. 24, the embodiment of FIG. 25 transfers wind energy from a top crankshaft 140 to a bottom crankshaft 142 via pull rods 146. A minimum of 3 throws for the crankshaft is recommended for this embodiment to ensure smooth transmission of the torque. Ideally the crankshaft should have its throws at 120 degrees from each other. In this embodiment pull-only connectors 148 are designed to transmit any axial pulling force, but to yield under axial pushing loads, i.e., compression, to avoid buckling of the rods 146. Additionally, as shown in FIG. 26, concave rollers 150 may be utilized to provide lateral support to the pull rods 146. Alternatively, bushes, sleeves or other sliding or rolling support systems can be used. As with the embodiment of FIG. 24, a turntable 44 may be employed in the embodiment of FIG. 25 to synchronize the bottom crankshaft 142 with the yaw of the nacelle 26.

Figure 27:
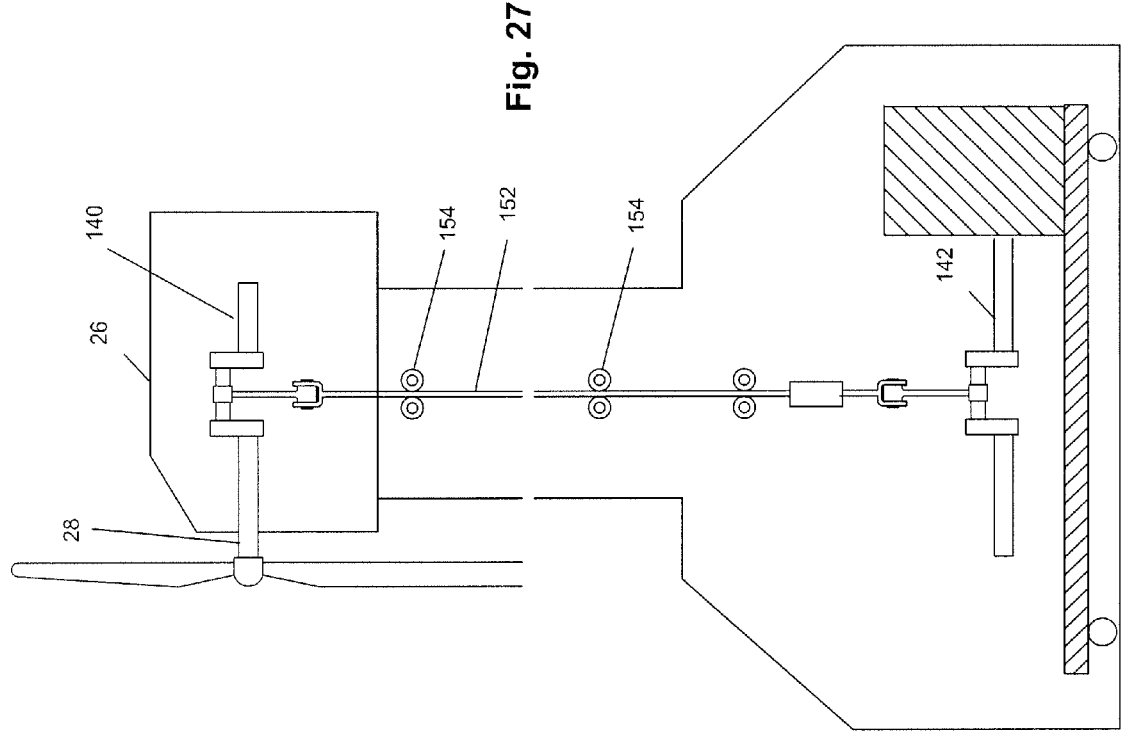
FIG. 27 is a schematic view of another embodiment of a turbine drive system utilizing crankshafts and push-pull rods.
Figure 28:
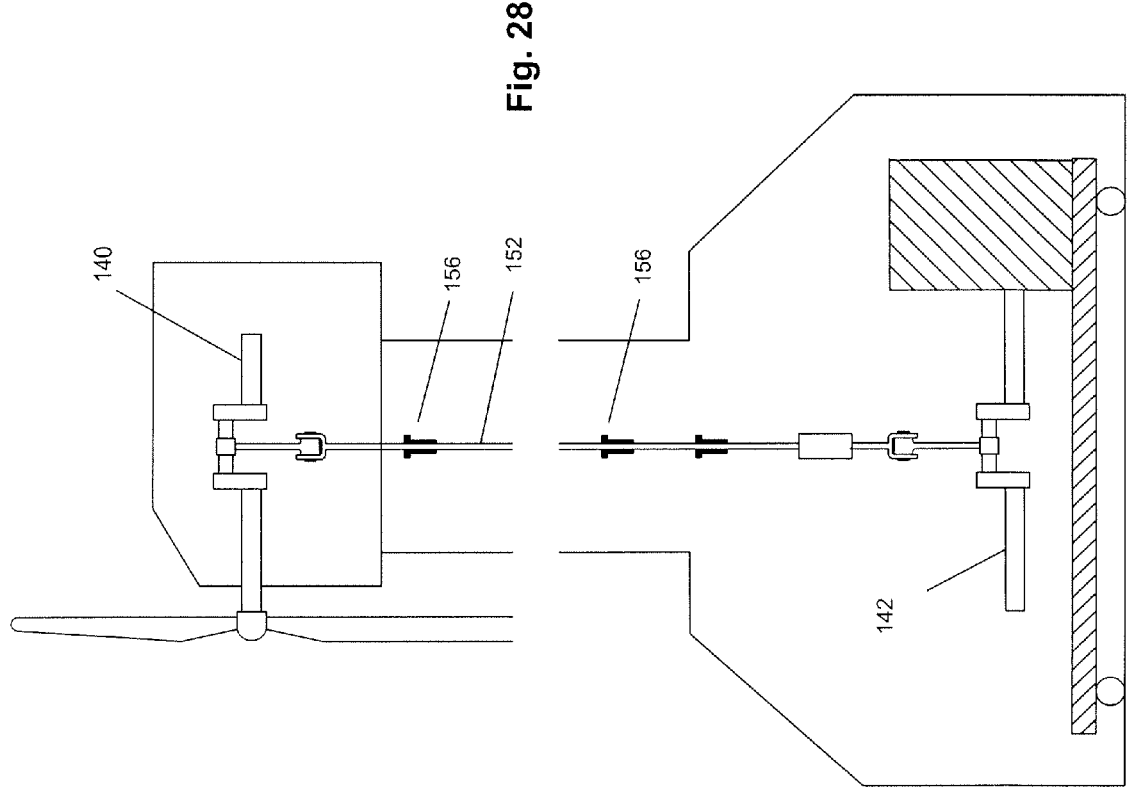
FIG. 28 is a schematic view of another embodiment of a turbine drive system utilizing crankshafts and push-pull rods.

FIG. 27 shows another embodiment similar to the embodiments of FIGS. 24 and 25, however, in this embodiment wind energy is transferred from a top crankshaft 140 to a bottom crankshaft 142 via push-pull rods 152. The push-pull rods 152 are designed to transmit force in any axial direction, but they need guidance to prevent buckling. Roller supports 154, as shown in FIG. 27, may provide such guidance. Alternately, bushings 156, as shown in FIG. 28, may provide such guidance.

Referring to FIG. 29, there is shown a hybrid turbine based on and enabled by the new "downstairs" architecture disclosed herein. The hybrid turbine of this embodiment opens up advantageous possibilities to deal with the intermittency of wind. In this embodiment a generator 40 is provided along with a natural gas turbine or engine 160. When the wind is blowing, clutch 162 connecting the generator 40 to the bottom rotation transfer member 38 is engaged, while clutch 164 connecting the engine 160 to the bottom rotation transfer member 38 is disengaged. Therefore the generator 40 is being driven by the wind. If the wind stops, clutch 164 can be engaged while clutch 162 is engaged. As a result, the generator 40 can now be driven by the gas turbine or gas engine 160. This allows the turbine owner to continue generating electricity even when there is no wind, which is not as "green" as pure wind operation, but which helps maintain grid stability and provides a higher income to the turbine owner, encouraging investment in new wind turbines. In addition, natural gas is significantly cleaner than coal, which would often be the alternative if there is no wind. Alternately, the gas engine 160 may be replaced with an air engine coupled to a compressor and a reservoir tank. In such an embodiment, energy can be stored in form of compressed air at times that the grid does not require electricity. The compressed air can be used to drive the air motor which in turn drives the generator. Alternatively the compressed air can be used to provide pressurized air to a natural gas turbine, which substantially increases its efficiency.

As described herein, belts and cables are utilized as flexible power transfer members to transfer torque from the top rotation transfer member 34 to the bottom rotation transfer member 38, and ultimately to the generator 40. Generally, the weak point of any belt is the joint between the ends of the belt, which is commonly referred as the splice. Typically a vulcanized splice is used, which normally includes the following steps: a) the ends of the belt are stripped of the rubber to expose the internal steel cables; b) the steel cables are positioned side by side for a considerable length, sometimes several meters; c) a layer of rubber is laid under the cables, and another layer of rubber is laid over the cables, to surround ("sandwich") the cables between the said layers; and, d) a vulcanizing press compresses and melts the rubber in the splice area, bonding the cables to the rubber. Therefore the typical vulcanizing splice relies on the bonding of the cables to the rubber. The ends of the cables themselves are not joined to each other with no metal to metal bonding. This method is generally reliable and has been used for many years. However, it is expensive and requires high skill. Furthermore, the splice remains the weakest point in a spliced belt.

Figure 31:
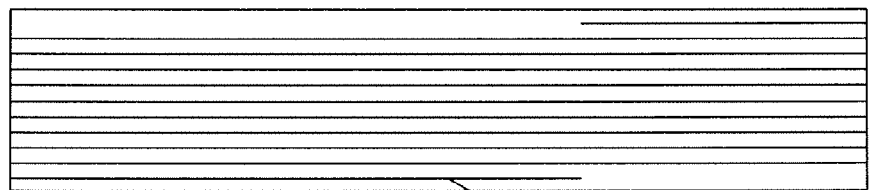
Figure 30:
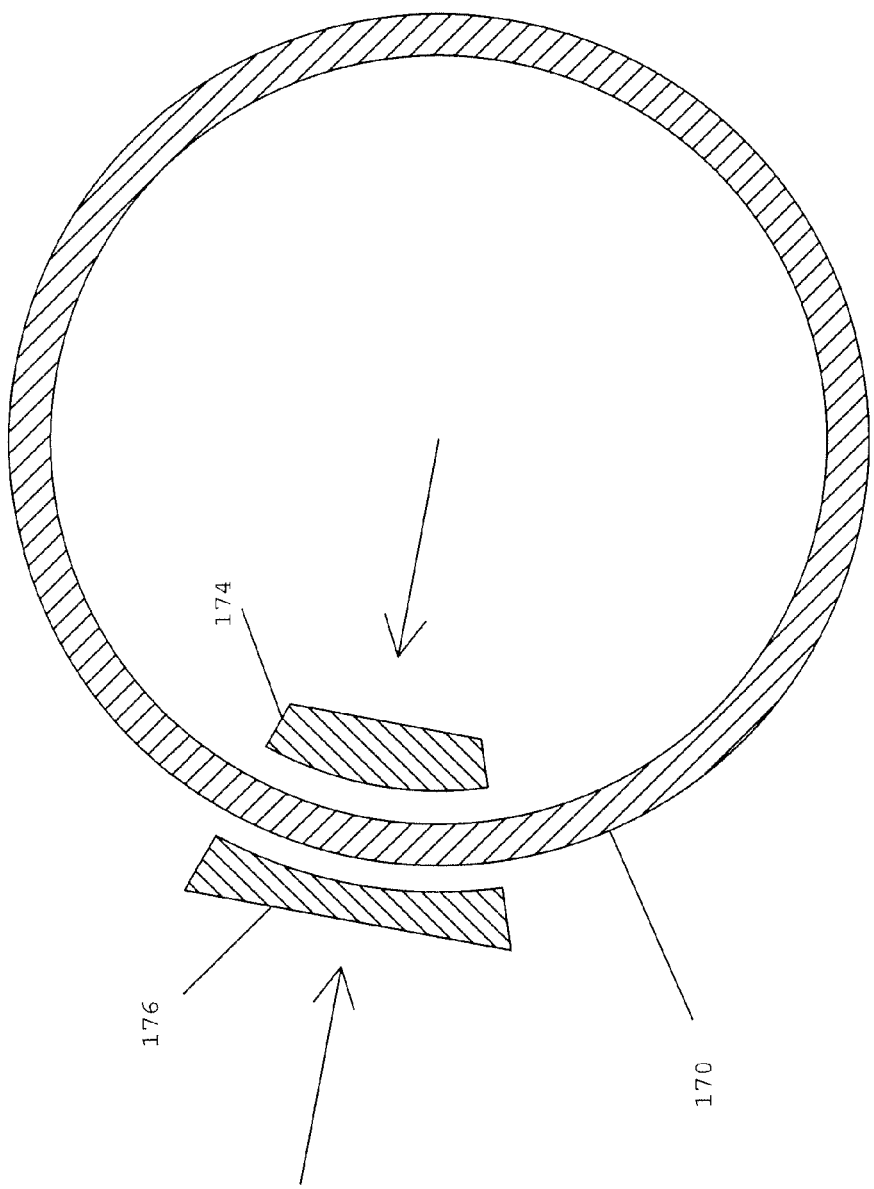
FIG. 30 is a schematic view of a fixture for creating an endless belt; and,
FIG. 31 is a side schematic view of FIG. 30.

The endless belt utilized herein and shown in FIGS. 30 and 31 eliminate the splice altogether. FIG. 30 shows a top view of one embodiment of the fixture utilized to make an endless belt. In this embodiment the cylindrical wheel 170 rotates about a vertical axis (FIG. 31 is a side view of the same fixture). The manufacturing sequence is as follows: a) rubber layer is attached to the outside of wheel 170; b) the cable 172 is wound around the wheel in a spiral (on top of the first rubber layer); c) another rubber layer is attached to the wheel, on top of the cable spiral; d) the inside portion 174 and the outside portion 176 of the vulcanizing press move toward each other, closing the press and applying heat and pressure to the belt, vulcanizing the pressurized area. After that the wheel rotates until a new area is in position to be vulcanized by the press. The process can be accelerated by having multiple presses working on the same wheel. Each press can also be designed to cover a significant angular portion of the belt, possible 45 degrees or even more, so that the belt can be vulcanized with a small number of rotations. Additionally, the winding direction of the cable spiral can generate internal tensions in the belt. Therefore, a possible improvement is to wind half the width of the wheel 170 with a left spiral, and the other half with a right spiral. This herringbone arrangement generally cancels out any internal imbalances.

An alternative manufacturing fixture for the belt would include two cylinders, with the cables spirally wound on top of and around the two cylinders. A separating force between the cylinders would keep the cables taut. A vulcanizing press or a liquid rubber dispenser would vulcanize rubber on top, under and between the cables. The above described processes to make an endless, splice-less belt can also be utilized with some simple adaptation to make an endless, splice-less cable, in order to use it in the cable-driven embodiments of this invention.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying claims.

What is claimed is:

1. A wind turbine system to generate electricity from wind energy, comprising:
   a tower that is able to rotate as a whole about a longitudinal axis therethrough;
   a nacelle fixedly attached adjacent a top of the tower without the possibility of the nacelle rotationally yawing about the tower;
   a turbine rotor supported by the nacelle, the rotor having a hub and a plurality of blades supported by the hub;
   a pitch mechanism to rotate the rotor blades in a desired angular position about the rotor blades longitudinal axis;
   a top rotation transfer member driven by the turbine rotor;
   a bottom rotation transfer member located inside the tower and substantially adjacent a bottom portion of the tower, wherein the top rotation transfer member comprises a first crankshaft connected to and driven by the turbine rotor, and wherein the bottom rotation transfer member comprises a second crankshaft connected to the generator;
   a flexible power transfer member inside the tower connecting the top rotation transfer member and the bottom rotation transfer member to transfer wind energy captured by the turbine rotor from the top rotation transfer member to the bottom rotation transfer member;
   a supporting platform substantially near a bottom of the tower to support the bottom rotation transfer member and a generator connected to the bottom rotation transfer mechanism; and,
   a powered tower rotation mechanism to rotate the tower about the tower's longitudinal axis in order to orient the turbine rotor in the desired direction with respect to the wind.

2. The wind turbine of claim 1, further comprising an actuator installed at a bottom portion of the tower to operate at times without wind and thus be able to continue to provide energy at times with no wind.

3. A wind turbine system to generate electricity from wind energy, comprising:
   a non-rotatable tower that is fixed in its position with respect to a ground;
   a rotatable nacelle rotatably attached to the tower;
   a turbine rotor supported by the nacelle, the rotor having a hub and a plurality of blades supported by the hub, the rotor and nacelle being able to yaw about the tower to orient the turbine rotor in a desired direction relative to the wind;
   a pitch mechanism to rotate the rotor blades in a desired angular position about the rotor blades longitudinal axis;
   a top rotation transfer member connected to and driven by the turbine rotor;
   a bottom rotation transfer member located inside the tower and substantially adjacent a bottom portion of the tower;
   a flexible power transfer member inside the tower connecting the top rotation transfer member and the bottom rotation transfer member to transfer wind energy captured by the turbine rotor from the top rotation transfer member to the bottom rotation transfer member;
   a generator connected to the bottom rotation transfer member;

a yawing system that rotates the nacelle about the tower to orient the turbine rotor in a desired direction with respect to the wind;

a powered synchronization system to substantially synchronize a rotation angle of the top rotation transfer member with a rotation angle of the bottom rotation transfer member, thus maintaining a desired alignment between the top rotation transfer member and the bottom rotation transfer member regardless of the yawing angle of the nacelle; and, an electronic control system that monitors and controls the turbine system.

4. The wind turbine system of claim 3, wherein the synchronization system comprises:

a turntable adjacent a bottom portion of the tower to rotatably support the bottom rotation transfer member and the generator;

at least one actuator connected to the turntable to rotate the turntable in sync with the yawing of the nacelle; and, a first sensor to monitor the angular position of the turntable, and a second sensor to monitor the angular position of the nacelle, the sensors providing signals to the electronic control system that coordinates rotation of the yawing system with the rotation of the turntable to substantially avoid misalignment and to stop the turbine system if any relevant misalignment is detected.

5. The wind turbine system of claim 3, wherein the synchronization system comprises a set of gears that allow the nacelle to rotate around a gear, thus maintaining proper alignment of top and bottom rotation members without a need for a turntable at the bottom of the tower.

6. The wind turbine system of claim 3, wherein the power transfer member is a cable that wraps around the top rotation transfer member and the bottom rotation transfer member to transmit rotation of the top rotation transfer member to the bottom rotation transfer member.

7. The wind turbine system of claim 3, wherein the power transfer member is a belt that wraps around the top rotation transfer member and the bottom rotation transfer member to transmit rotation of the top rotation transfer member to the bottom rotation transfer member.

8. The wind turbine system of claim 3, wherein the top rotation transfer member comprises a crankshaft connected to and driven by the turbine rotor, and wherein the bottom rotation transfer member comprises a crankshaft connected to the generator.

9. The wind turbine system of claim 3, further comprising at least one idler member between the top rotation transfer member and the bottom rotation transfer member, the idler member having at least two different diameters in to achieve a step-up ratio between the top and bottom rotation transfer members.

10. The wind turbine system of claim 3, wherein the tower has a cross-section with an elongated dimension in a direction perpendicular to a longitudinal axis of the tower to increase the tower's moment of inertia against bending, as well as minimizing the wind forces against the tower.

11. The wind turbine of claim 3, further comprising an actuator installed at the bottom of the tower to operate at times without wind and thus be able to continue to provide energy at times with no wind.

* * * * *